(12) United States Patent
Gotou

(10) Patent No.: US 6,759,821 B2
(45) Date of Patent: Jul. 6, 2004

(54) DISK DRIVE APPARATUS AND MOTOR

(75) Inventor: Makoto Gotou, Naruo-cho (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/453,275

(22) Filed: Jun. 2, 2003

(65) Prior Publication Data

US 2003/0205976 A1 Nov. 6, 2003

Related U.S. Application Data

(63) Continuation of application No. 10/016,004, filed on Oct. 26, 2001, now Pat. No. 6,600,287.

(30) Foreign Application Priority Data

Oct. 27, 2000 (JP) ........................................ 2000-328593

(51) Int. Cl.[7] ................................................ H02P 5/06
(52) U.S. Cl. ........................ 318/254; 318/138; 318/139; 318/439; 318/560; 318/599; 360/73.01
(58) Field of Search ................................ 318/138, 254, 318/139, 439, 560, 599; 360/73.01

(56) References Cited

U.S. PATENT DOCUMENTS

| 4,356,437 | A | | 10/1982 | Saito et al. | |
|---|---|---|---|---|---|
| 5,130,620 | A | | 7/1992 | Inaji et al. | |
| 5,161,073 | A | | 11/1992 | Gami et al. | |
| 5,210,474 | A | | 5/1993 | Oswald | |
| 5,246,479 | A | | 9/1993 | Gami et al. | |
| 5,473,232 | A | | 12/1995 | Tamaki et al. | |
| 5,729,102 | A | | 3/1998 | Gotou et al. | |
| 5,982,133 | A | * | 11/1999 | Murakami et al. | 318/650 |
| 6,204,621 | B1 | | 3/2001 | Gotou | |
| 6,242,875 | B1 | * | 6/2001 | Kusaka et al. | 318/254 |
| 6,316,894 | B2 | * | 11/2001 | Hashimura | 318/439 |
| 6,411,057 | B2 | * | 6/2002 | Gotou | 318/599 |
| 6,570,357 | B2 | * | 5/2003 | Gotou | 318/599 |
| 6,586,902 | B2 | * | 7/2003 | Gotou et al. | 318/560 |
| 6,600,287 | B2 | * | 7/2003 | Gotou | 318/599 |

* cited by examiner

*Primary Examiner*—Robert Nappi
*Assistant Examiner*—Tyrone Smith
(74) *Attorney, Agent, or Firm*—Akin Gump Strauss Hauer & Feld, LLP

(57) ABSTRACT

A disk drive apparatus reproduces a signal from a disk and/or records an signal on the disk. A position detecting part produces a position signal in response to a rotation of a rotor. An activation operation block controls active operation of first and second power amplifying parts in response to the position signal. A signal producing part produces a slope signal which repeats a slope waveform a plural times during one period of the position signal. The shaping part produces first and second activation control signals which responds with the slope signal. The activation operation block controls the first and second power amplifying parts responding with the first and second activation control signals. Therefore, an excellent disk drive apparatus with reduced acoustic noise and reduced vibration can be realized by using only one position signal of one position sensor.

40 Claims, 26 Drawing Sheets

F I G. 9(a)
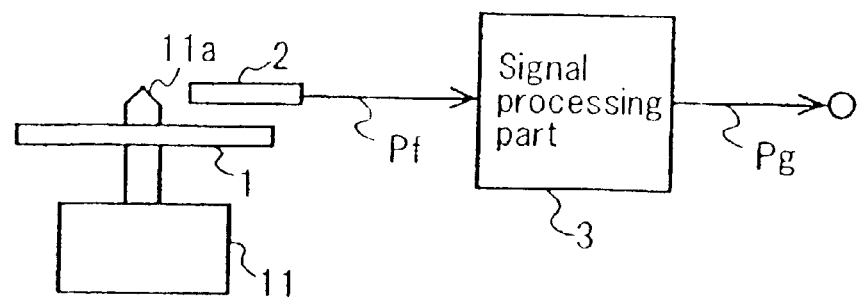
F I G. 9(b)
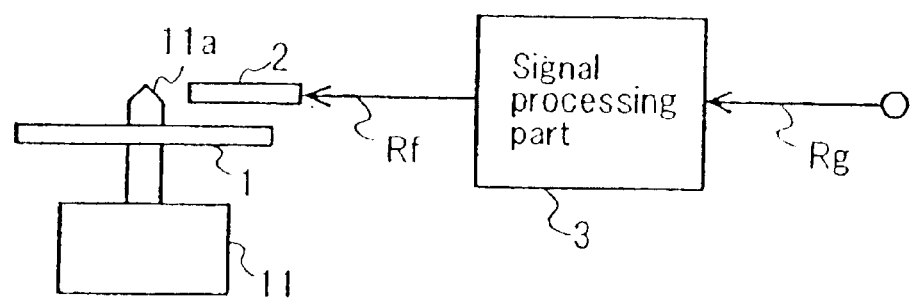

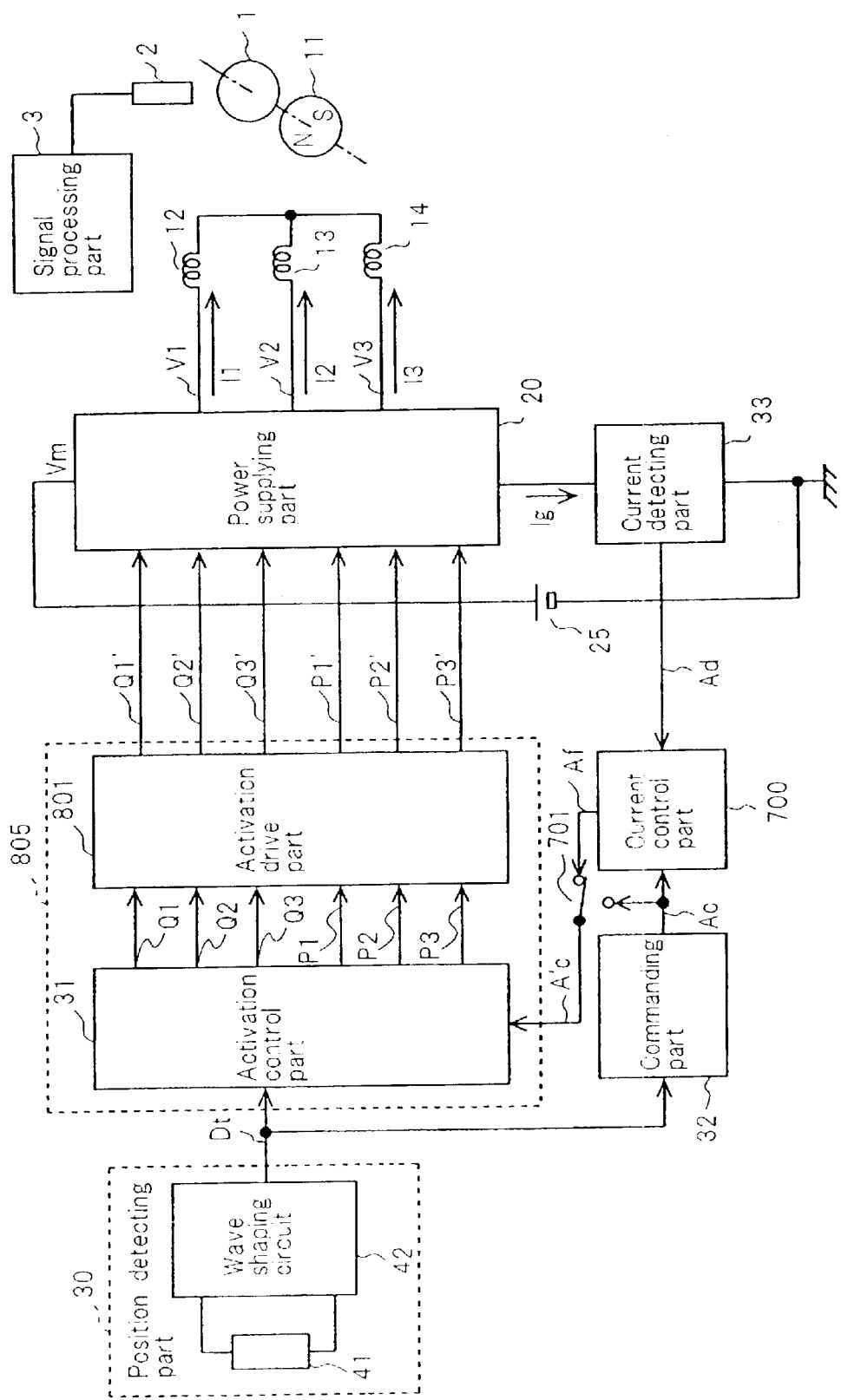
F I G. 25

DISK DRIVE APPARATUS AND MOTOR

This is a continuation of application Ser. No. 10/016,004, filed Oct. 26, 2001, now U.S. Pat. No. 6,600,287.

FIELD OF THE INVENTION

The present invention relates to a disk drive apparatus including a motor, and to a motor which can be used in a disk drive apparatus.

BACKGROUND OF THE INVENTION

In recent years, a motor which electrically alters current paths by a plural transistors has been widely used as a drive motor in an office automation equipment and an audio-visual equipment. A disk drive apparatus such as an optical disk drive apparatus (DVD, CD, and the like) and a magnetic disk drive apparatus (HDD, FDD, and the like) includes such a motor.

FIG. 29 shows a prior art motor, which alters current paths to the windings by PNP-type bipolar power transistors and NPN-type bipolar power transistors. The operation of the prior art motor is described hereinbelow. A rotor 2011 has a field part formed by a permanent magnet. In a position detector 2041, three position detecting elements (three position sensors) detect magnetic field of the field part of the rotor 2011. The position detector 2041 produces two sets of three-phase voltage signals Kp1, Kp2, Kp3, and Kp4, Kp5, Kp6 on the basis of the three-phase output signals of the three position detecting elements in response to the rotation of the rotor 2011.

A first distributor 2042 produces three-phase lower-side signals Mp1, Mp2, and Mp3 in response to the voltage signals Kp1, Kp2, and Kp3, thereby controlling the activation of lower-side NPN-type bipolar power transistors 2021, 2022, and 2023.

A second distributor 2043 produces three-phase upper-side signals Mp4, Mp5, and Mp6 in response to the voltage signals Kp4, Kp5, and Kp6, thereby controlling the activation of upper-side PNP-type bipolar power transistors 2025, 2026, and 2027. Accordingly, three-phase drive voltage signals are provided to windings 2012, 2013, and 2014.

In this prior art configuration, the position detector 2041 comprises three position detecting elements for detecting the rotational position of the rotor 2011. This has caused the necessity of a substantial space for installing these position detecting elements and the complexity of the wiring, and hence an increase in the cost.

On the other hand, a motor without a position detecting element is disclosed in the specifications of the U.S. Pat. Nos. 5,130,620 and 5,473,232, and the motor detects back-electromotive forces of the windings so as to obtain a rotational position of the rotor. The motor without a position detecting element, however, can not detect correctly the rotational position at a low rotational speed of the motor, since the amplitudes of the back-electromotive forces become too small to detect at a low rotational speed of the motor. So, it is difficult to drive and control the motor at a low speed. In particular, in case that the rotational speed is controlled by using the pulse signal responding with the detected back-electromotive forces, a large fluctuation of the rotational speed of the motor occurs at a low speed because of inaccurate detection of the pulse signal.

A motor with a single position detecting element is disclosed in the specification of the U.S. Pat. No. 5,729,102. The motor estimates the rotational electrical angle from the output of the single position detecting element, and supplies sinusoidal currents to the windings on the basis of the estimated rotational electrical angle. But, in the configuration of the motor according to the U.S. Pat. No. 5,729,102, it is difficult to estimate the rotational electrical angle with a fine step resolution. In particular, the error in the estimated electrical angle becomes larger at a higher rotational speed. Accordingly, a precise rotation control of the motor has been difficult.

In addition, since a microprocessor is used in the calculation of the estimated electrical angle and the generation of the drive signal, an inexpensive microprocessor can not be sufficient in the processing performance at a high rotational speed. This has caused a difficulty in the high-speed operation of the motor.

In an optical disk drive apparatus for reproducing DVD-ROM, CD-ROM, and CD disks, a stable operation is required over a wide range of rotational speed from 10,000 rpm at high-speed reproduction to 200 rpm at CD reproduction. In a rewritable disk drive apparatus for recording an information signal to a high-density disk and/or reproducing an information signal from a high-density disk such as DVD-RAM/RW, CD-R/RW, and the like, a precise rotation of the disk is required. In a magnetic disk drive apparatus such as HDD and FDD, a stable and precise rotation of the disk is required.

It is therefore an object of the present invention to solve the above-mentioned problems, respectively and concurrently and provide a disk drive apparatus and/or a motor which has the configuration to overcome all or some or each of the above-mentioned problems.

BRIEF SUMMARY OF THE INVENTION

The disk drive apparatus in accordance with the present invention comprises: head means for at least reproducing a signal from a disk or recording a signal on said disk; processing means for at least processing an output signal from said head means and outputting a reproduced signal, or processing a signal and outputting a recording signal into said head means; a rotor, having a field part which generates field fluxes, for driving said disk; Q-phase windings (Q is an integer of 3 or more); voltage supplying means, including two output terminals, for supplying a DC voltage; Q first power amplifying means, each of said Q first power amplifying means including a first power transistor for forming a current path between one output terminal side of said voltage supplying means and one of said Q-phase windings; Q second power amplifying means, each of said Q second power amplifying means including a second power transistor for forming a current path between the other output terminal side of said voltage supplying means and one of said Q-phase windings; position detecting means for producing a position signal which responds with a rotation of said rotor; and activation operation means for controlling active periods of said Q first power amplifying means and said Q second power amplifying means responding with said position signal of said position detecting means, each of said active periods being larger than the period of 360/Q electrical degrees; and that said activation operation means comprises: time measuring means for measuring a time interval T0 which responds with an interval of said position signal; first timing means for changing the state of a first state signal at an interval of a first adjust time T1 which responds with said time interval T0 and is less than T0/2, and setting said first state signal substantially to a first predetermined state responding with the measuring operation of said time measuring means; second timing means for changing the state of a second state signal at an interval of a second adjust time T2 which responds with said time interval T0 and is less than T1/2, and setting said second state signal substantially to a second predetermined state responding with a changing operation of said first state signal; and signal producing means for producing at least an activation control signal which responds with said first state signal and said second state signal, thereby controlling an active period of at least one power amplifying means among said Q first power amplifying means and said Q second power amplifying means responding with said at least an activation control signal; and said signal producing means includes: slope means for producing a slope signal which responds with said second state signal; and shaping means for producing said at least an activation control signal which responds with said slope signal and said first state signal, said at least an activation control signal varying substantially smoothly in at least one of rising and falling slopes responding with said slope signal.

In this configuration, the activation to the Q-phase windings can be accurately controlled in response to a single position signal. So, a disk drive apparatus with only one position detecting element is realized, and the disk drive apparatus alters current paths to the Q-phase windings by using an output signal of the only one position detecting element and drives stably the disk in a predetermined direction. The activation control signal has a rising slope, a flat top, and a falling slope.

At least one of the rising and falling slopes of the activation control signal changes substantially smoothly in response to the slope signal. Accordingly, the alteration of current paths to the Q-phase windings becomes smooth. This reduces the pulsation of the generated drive force, and a disk drive apparatus with a reduced disk vibration and a reduced acoustic noise is realized. The slope signal can be an analogous signal which has at least one of rising and falling slopes, or alternatively a digital signal composed of pulses whose average gives a slope.

Further, the first timing means changes the state of the first state signal at an interval of the first adjust time T1 (where T1<T0/2) which responds with the measurement result (the time interval T0) of the time measuring means, and the second timing means changes the state of the second state signal at an interval of the second adjust time T2 (where T2<T1/2) which responds with the measurement result (the time interval T0) of the time measuring means. Accordingly, before the time measuring means outputs the next measurement result, the first timing means changes the state of the first state signal by a predetermined number of states. Before the first timing means executes the next change of the first state signal, the second timing means changes the state of the second state signal by a predetermined number of states.

The signal producing means produces the slope signal which substantially has a slope in response to the second state signal, and produces the activation control signal in response to the first state signal and the slope signal. Accordingly, even if the disk speed is changed, the signal producing means produces the activation control signal which varies substantially smoothly in response to the slope signal. Thus, even in a disk drive apparatus whose disk speed is changed in response to the radial position of the head means, current paths to the Q-phase windings are always altered smoothly. This reduces the pulsation of the generated drive force, and a disk drive apparatus with a reduced disk vibration and a reduced acoustic noise is realized.

Furthermore, the first timing means sets the first state signal to a first predetermined state in response to the measuring operation of the time measuring means. And the second timing means sets the second state signal to a second predetermined state in response to the changing operation of the first state signal. Accordingly, the slope signal is changed in synchronization with the changing operation of the first state signal. Thus, the activation control signal is accurately produced in synchronization with the rotation of the rotor, thereby avoiding a variation in the activation control of the Q-phase windings. In addition, in case that the disk rotational speed is controlled on the basis of the position signal, for example, the rotational speed is controlled stably and accurately even at a low speed. As a result, a high-performance disk drive apparatus with a reduced disk vibration and a reduced acoustic noise is realized by an inexpensive configuration having a simplified position detecting means.

The disk drive apparatus in accordance with another aspect of the invention comprises: head means for at least reproducing a signal from a disk or recording a signal on said disk; processing means for at least processing an output signal from said head means and outputting a reproduced signal, or processing a signal and outputting a recording signal into said head means; a rotor, having a field part which generates field fluxes, for driving said disk; Q-phase windings (Q is an integer of 3 or more); voltage supplying means, including two output terminals, for supplying a DC voltage; Q first power amplifying means, each of said Q first power amplifying means including a first power transistor for forming a current path between one output terminal side of said voltage supplying means and one of said Q-phase windings; Q second power amplifying means, each of said Q second power amplifying means including a second power transistor for forming a current path between the other output terminal side of said voltage supplying means and one of said Q-phase windings; position detecting means for producing a position signal which responds with a rotation of said rotor; and activation operation means for controlling active periods of said Q first power amplifying means and said Q second power amplifying means responding with said position signal of said position detecting means, each of said active periods being larger than the period of 360/Q electrical degrees; and that said activation operation means comprises: time measuring means for measuring a time interval T0 which responds with an interval of said position signal; first timing means for changing the state of a first state signal at an interval of a first adjust time T1 which responds with said time internal T0 and is less than T0/2; second timing means for changing the state of a second state signal at an interval of a second adjust time T2 which responds with said time interval T0 and is less than T1/2; and signal producing means for producing at least an activation control signal which responds with said first state signal and said second state signal, thereby controlling an active period of at least one power amplifying means among said Q first power amplifying means and said Q second power amplifying means responding with said at least an activation control signal.

In this configuration, the activation of the Q-phase windings can be accurately controlled in response to a single position signal. So, a disk drive apparatus with only one position detecting element is realized, and the disk drive apparatus alters current paths to the Q-phase windings by using an output signal of the only one position detecting element and drives stably the disk in a predetermined direction.

Further, the first timing means changes the state of the first state signal at an interval of the first adjust time T1 (where T1<T0/2) which responds with the measurement result (the time interval T0) of the time measuring means, and the second timing means changes the state of the second state signal at an interval of the second adjust time T2 (where T2<T1/2) which responds with the measurement result (the time interval T0) of the time measuring means. Accordingly, before the time measuring means outputs the next measurement result, the first timing means changes the state of the first state signal by a predetermined number of states.

Before the first timing means executes the next change of the first state signal, the second timing means changes the state of the second state signal by a predetermined number of states. Accordingly, since the alteration of current paths to the Q-phase is executed in response to the first state signal and the second state signal, the disk drive apparatus drives the disk stably and accurately.

For example, in case that a slope signal which substantially has at least one of rising and falling slopes is produced in response to the second state signal, the rising and falling slopes of the. activation control signal can be substantially smoothed in response to the slope signal. Then the alteration of current paths to the Q-phase windings is achieved smoothly. This reduces the pulsation in the generated drive force, and a disk drive apparatus with a reduced disk vibration and a reduced acoustic noise is realized.

Further, the number of the states of the first state signal in the time interval T0 and the number of the states of the second state signal in the first adjust time T1 remain constant even when the disk rotational speed has changed. So, the disk drive apparatus can produce such an excellent activation control signal that the alteration of current paths to the Q-phase windings is achieved smoothly in response to the activation control signal. Thus, even in a disk drive apparatus whose disk speed is changed in response to the radial position of the head means, current paths to the Q-phase windings are always altered smoothly. This reduces the pulsation of the generated drive force, and a disk drive apparatus with a reduced disk vibration and a reduced acoustic noise is realized.

The first timing means can set the first state signal to a first predetermined state in response to the measuring operation of the time measuring means, for example. And the second timing means can set the second state signal to a second predetermined state in response to the changing operation of the first state signal, for example. These easily achieve to synchronize the second state signal to the first state signal and to synchronize the first state signal to the position signal. Thus, the activation control signal is produced in synchronization with the rotation of the rotor, thereby avoiding a variation in the activation control of the Q-phase windings.

In addition, in case that the disk rotational speed is controlled on the basis of the position signal, for example, the rotational speed is controlled stably and accurately even at a low speed. As a result, a high-performance disk drive apparatus with a reduced disk vibration and a reduced acoustic noise is realized by an inexpensive configuration having a simplified position detecting means.

The motor in accordance with another aspect of the invention comprises: a rotor having a field part which generates field fluxes; Q-phase windings (Q is an integer of 3 or more); voltage supplying means, including two output terminals, for supplying a DC voltage; Q first power amplifying means, each of said Q first power amplifying means including a first power transistor for forming a current path between one output terminal side of said voltage supplying means and one of said Q-phase windings; Q second power amplifying means, each of said Q second power amplifying means including a second power transistor for forming a current path between the other output terminal side of said voltage supplying means and one of said Q-phase windings; position detecting means for producing a position signal which responds with a rotation of said rotor; and activation operation means for controlling active periods of said Q first power amplifying means and said Q second power amplifying means responding with said position signal of said position detecting means, each of said active periods being larger than the period of 360/Q electrical degrees; and that said activation operation means comprises: time measuring means for measuring a time interval T0 which responds with an interval of said position signal; first timing means for changing the state of a first state signal at an interval of a first adjust time T1 which responds with said time interval T0 and is less than T0/2, and setting said first state signal substantially to a first predetermined state responding with the measuring operation of said time measuring means; second timing means for changing the state of a second state signal at an interval of a second adjust time T2 which responds with said time interval T0 and is less than T1/2, and setting said second state signal substantially to a second predetermined state responding with a changing operation of said first state signal; and signal producing means for producing at least an activation control signal which responds with said first state signal and said second state signal, thereby controlling an active period of at least one power amplifying means among said Q first power amplifying means and said Q second power amplifying means responding with said at least an activation control signal; and said signal producing means includes: slope means for producing a slope signal which responds with said second state signal; and shaping means for producing said at least an activation control signal which responds with said slope signal and said first state signal, said at least an activation control signal varying substantially smoothly in at least one of rising and falling slopes responding with said slope signal.

In this configuration, the activation to the Q-phase windings can be accurately controlled in response to a single position signal. So, a motor with only one position detecting element is realized, and the motor alters current paths to the Q-phase windings by using an output signal of the only one position detecting element and drives stably the rotor in a predetermined direction.

The activation control signal has a rising slope, a flat top, and a falling slope. At least one of the rising and falling slopes of the activation control signal changes substantially smoothly in response to the slope signal. Accordingly, the alteration of current paths to the Q-phase windings becomes smooth. This reduces the pulsation of the generated drive force, and a motor with a reduced motor vibration and a reduced acoustic noise is realized.

The slope signal can be an analogous signal which has at least one of rising and falling slopes, or alternatively a digital signal composed of pulses whose average gives a slope. Further, the first timing means changes the state of the first state signal at an interval of the first adjust time T1 (where T1<T0/2) which responds with the measurement result (the time interval T0) of the time measuring means, and the second timing means changes the state of the second state signal at an interval of the second adjust time T2 (where T2<T1/2) which responds with the measurement result (the time interval T0) of the time measuring means.

Accordingly, before the time measuring means outputs the next measurement result, the first timing means changes the state of the first state signal by a predetermined number of states. Before the first timing means executes the next change of the first state signal, the second timing means changes the state of the second state signal by a predetermined number of states.

The signal producing means produces the slope signal which substantially has a slope in response to the second state signal, and produces the activation control signal in response to the first state signal and the slope signal. Accordingly, even if the motor speed is changed, the signal producing means produces the activation control signal which varies substantially smoothly in response to the slope signal.

Thus, even in a motor whose rotor speed is changed, current paths to the Q-phase windings are always altered smoothly. This reduces the pulsation of the generated drive force, and a motor with a reduced motor vibration and a reduced acoustic noise is realized.

Furthermore, the first timing means sets the first state signal to a first predetermined state in response to the measuring operation of the time measuring means. And the second timing means sets the second state signal to a second predetermined state in response to the changing operation of the first state signal. Accordingly, the slope signal is changed in synchronization with the changing operation of the first state signal. Thus, the activation control signal is accurately produced in synchronization with the rotation of the rotor, thereby avoiding a variation in the activation control of the Q-phase windings.

In addition, in case that the rotational speed is controlled on the basis of the position signal, for example, the rotational speed is controlled stably and accurately even at a low speed. As a result, a high-performance motor with a reduced motor vibration and a reduced acoustic noise is realized by an inexpensive configuration having a simplified position detecting means.

The motor in accordance with another aspect of the invention comprises: a rotor having a field part which generates field fluxes; Q-phase windings (Q is an integer of 3 or more); voltage supplying means, including two output terminals, for supplying a DC voltage; Q first power amplifying means, each of said Q first power amplifying means including a first power transistor for forming a current path between one output terminal side of said voltage supplying means and one of said Q-phase windings; Q second power amplifying means, each of said Q second power amplifying means including a second power transistor for forming a current path between the other output terminal side of said voltage supplying means and one of said Q-phase windings; position detecting means for producing a position signal which responds with a rotation of said rotor; and activation operation means for controlling active periods of said Q first power amplifying means and said Q second power amplifying means responding with said position signal of said position detecting means, each of said active periods being larger than the period of 360/Q electrical degrees; and that said activation operation means comprises: time measuring means for measuring a time interval T0 which responds with an interval of said position signal; first timing means for changing the state of a first state signal at an interval of a first adjust time T1 which responds with said time interval T0 and is less than T0/2; second timing means for changing the state of a second state signal at an interval of a second adjust time T2 which responds with said time interval T0 and is less than T1/2; and signal producing means for producing at least an activation control signal which responds with said first state signal and said second state signal, thereby controlling an active period of at least one power amplifying means among said Q first power amplifying means and said Q second power amplifying means responding with said at least an activation control signal.

In this configuration, the activation of the Q-phase windings can be accurately controlled in response to a single position signal. So, a motor with only one position detecting element is realized, and the motor alters current paths to the Q-phase windings by using an output signal of the only one position detecting element and drives stably the rotor in a predetermined direction. Further, the first timing means changes the state of the first state signal at an interval of the first adjust time T1 (where T1<T0/2) which responds with the measurement result (the time interval T0) of the time measuring means, and the second timing means changes the state of the second state signal at an interval of the second adjust time T2 (where T2<T1/2) which responds with the measurement result (the time interval T0) of the time measuring means. Accordingly, before the time measuring means outputs the next measurement result, the first timing means changes the state of the first state signal by a predetermined number of states.

Before the first timing means executes the next change of the first state signal, the second timing means changes the state of the second state signal by a predetermined number of states. Accordingly, since the alteration of current paths to the Q-phase is executed in response to the first state signal and the second state signal, the motor drives the rotor stably and accurately.

For example, in case that a slope signal which substantially has at least one of rising and falling slopes is produced in response to the second state signal, the rising and falling slopes of the activation control signal can be substantially smoothed in response to the slope signal. Then the alteration of current paths to the Q-phase windings is achieved smoothly. This reduces the pulsation in the generated drive force, and a motor with a reduced motor vibration and a reduced acoustic noise is realized. Further, the number of the states of the first state signal in the time interval T0 and the number of the states of the second state signal in the first adjust time T1 remain constant even when the rotational speed has changed. So, the motor can produce such an excellent activation control signal that the alteration of current paths to the Q-phase windings is achieved smoothly in response to the activation control signal. Thus, even in a motor whose rotor speed is changed, current paths to the Q-phase windings are always altered smoothly. This reduces the pulsation of the generated drive force, and a motor with a reduced motor vibration and a reduced acoustic noise is realized.

The first timing means can set the first state signal to a first predetermined state in response to the measuring operation of the time measuring means, for example. And the second timing means can set the second state signal to a second predetermined state in response to the changing operation of the first state signal, for example. These easily achieve to synchronize the second state signal to the first state signal and to synchronize the first state signal to the position signal. Thus, the activation control signal is produced in synchronization with the rotation of the rotor, thereby avoiding a variation in the activation control of the Q-phase windings.

In addition, in case that the rotational speed is controlled on the basis of the position signal, for example, the rotational speed is controlled stably and accurately even at a low speed. As a result, a high-performance motor with a reduced motor vibration and a reduced acoustic noise is realized by an inexpensive configuration having a simplified position detecting means.

The above-mentioned and other configurations and their operations are described below in detail in the section of Brief Description of the Drawings.

BRIEF DESCRIPTION OF THE DRAWINGS

FIGS. 9(a,b) show block diagrams on an information signal of a disk drive apparatus in accordance with Embodiment 1.

FIG. 25 shows the overall configuration in accordance with Embodiment 5 of the invention.

DETAILED DESCRIPTION OF THE INVENTION

Preferred embodiments of the present invention are described below with reference to the drawings.

[Embodiment 1]

Figure 1:
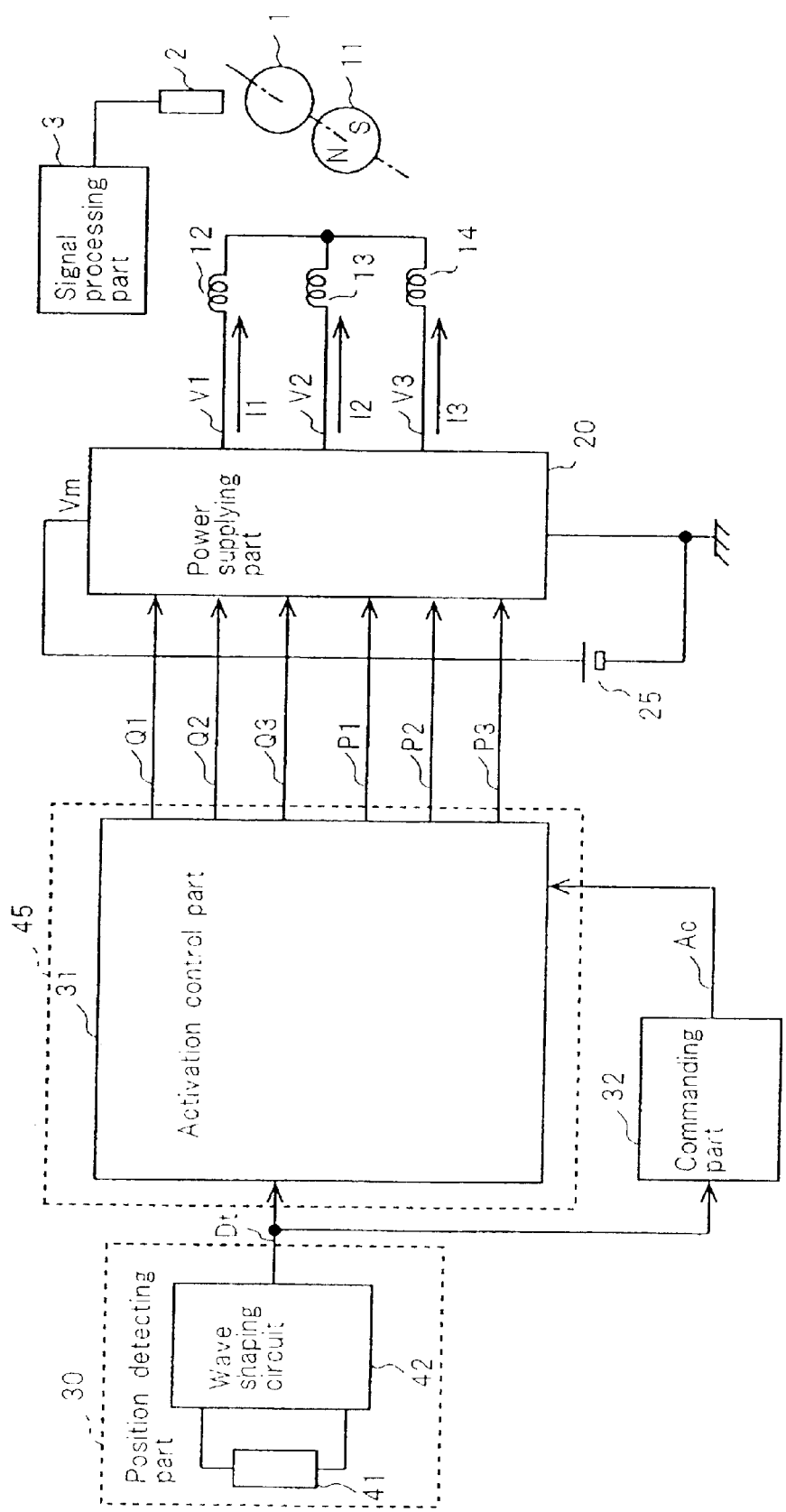
FIG. 1 shows the overall configuration in accordance with Embodiment 1 of the invention.

FIGS. 1–9 show a disk drive apparatus comprising a motor in accordance with Embodiment 1 of the invention, and also a motor which is suitable for use in the disk drive apparatus. FIG. 1 shows the overall configuration. A rotor 11 is provided with a field part, which produces the multipolar magnetic field by the magnetic fluxes of a magnet. In this embodiment, the field part has a pair of N and S poles of a permanent magnet. The field part, however, can have plural pairs of N and S poles constituted by a permanent magnet or a group of permanent magnets. Three-phase windings 12, 13, and 14 are disposed on a stator, and the windings have a displacement of 120 electrical degrees each other with respect to the field part of the rotor 11. Here, the spatial angle of N pole and S pole corresponds to the electrical angle of 360 degrees.

The three-phase winding 12, 13, and 14 are connected in common at one ends, and the other ends of the three-phase winding 12, 13, and 14 are connected to the output terminals of a power supplying part 20 as power supply terminals, respectively. The three-phase windings 12, 13, and 14 generate three-phase magnetic fluxes by three-phase drive current signals I1, I2, and I3 conducted in them. A drive force is generated by the interaction between the three-phase drive current signals and the field part of the rotor 11, and the generated drive force drives the rotor 11. A disk 1 fixed to the rotor 11 is directly driven by the rotor 11.

In case of reproducing a digital information signal (such as a high-quality audio signal and/or a video signal) from the disl 1, a head part 2 (including an optical head or a magnetic head and a position adjusting mechanism) reproduces the signal from the disk 1. An information processing part 3 processes the output signal of the head part 2, and outputs a reproduced information signal.

In case of recording a digital information signal (such as a high-quality audio signal and/or a video signal) on the disk 1, the head part 2 (including an optical head or a magnetic head and a position adjusting mechanism) records the signal on the disk 1. The information processing part 3 provides a recording signal to the head part 2 by processing an input information signal.

FIG. 9(a) shows an example of a disk drive apparatus which reproduces a signal from a disk. The disk 1 fixed to the rotor 11 is directly driven by the rotor 11. A digital information signal is recorded on the disk 1 in a high density. The head part 2 reproduces the information signal from the disk 1, and outputs are produced signal Pf. The information processing part 3 digitally processes the reproduced signal Pf of the head part 2, and outputs a reproduced information signal Pg. In the figure, the stator and the windings are not shown.

FIG. 9(b) shows an example of a disk drive apparatus which records a signal on a disk. The disk 1 fixed to the rotor 11 is directly driven by the rotor 11. The disk 1 is a high density recordable disk. The information processing part 3 digitally processes an input information signal Rg, and outputs a recording signal Rf to the head part 2. The head part 2 records the recording signal Rf on the disk 1 in a high density, and forms a new information signal on the disk 1.

The above-mentioned head part 2 can be a reproducing-only head, a recording-reproducing head or a recording-only head, depending on the situation.

A position detecting part 30 shown in FIG. 1 comprises a position sensor 41 (a position detecting element) and a wave shaping circuit 42. The position sensor 41 is a Hall device which is a magneto-electric conversion device, for example. The position sensor 41 detects a magnetic flux of the field part of the rotor 11, and outputs a position detected signal (a position signal) in an analogue manner in response to the rotational position of the rotor 11.

The wave shaping circuit 42 shapes digitally the waveform of the position detected signal of the position sensor 41, and outputs a single position pulse signal Dt (a position signal). Here, the position detected signal of the position sensor 41 or the position pulse signal Dt of the wave shaping circuit 42 is a position signal which corresponds to the rotational position of the rotor 11.

A commanding part 32 shown in FIG. 1 detects the rotational speed of the disk 1 and the rotor 11 from the position pulse signal Dt of the position detecting part 30. The commanding part 32 produces a command signal Ac in response to the difference between the rotational speed and the aimed speed of the disk 1. The command signal Ac of the commanding part 32 is a voltage signal which responds with the position pulse signal Dt.

Figure 2:
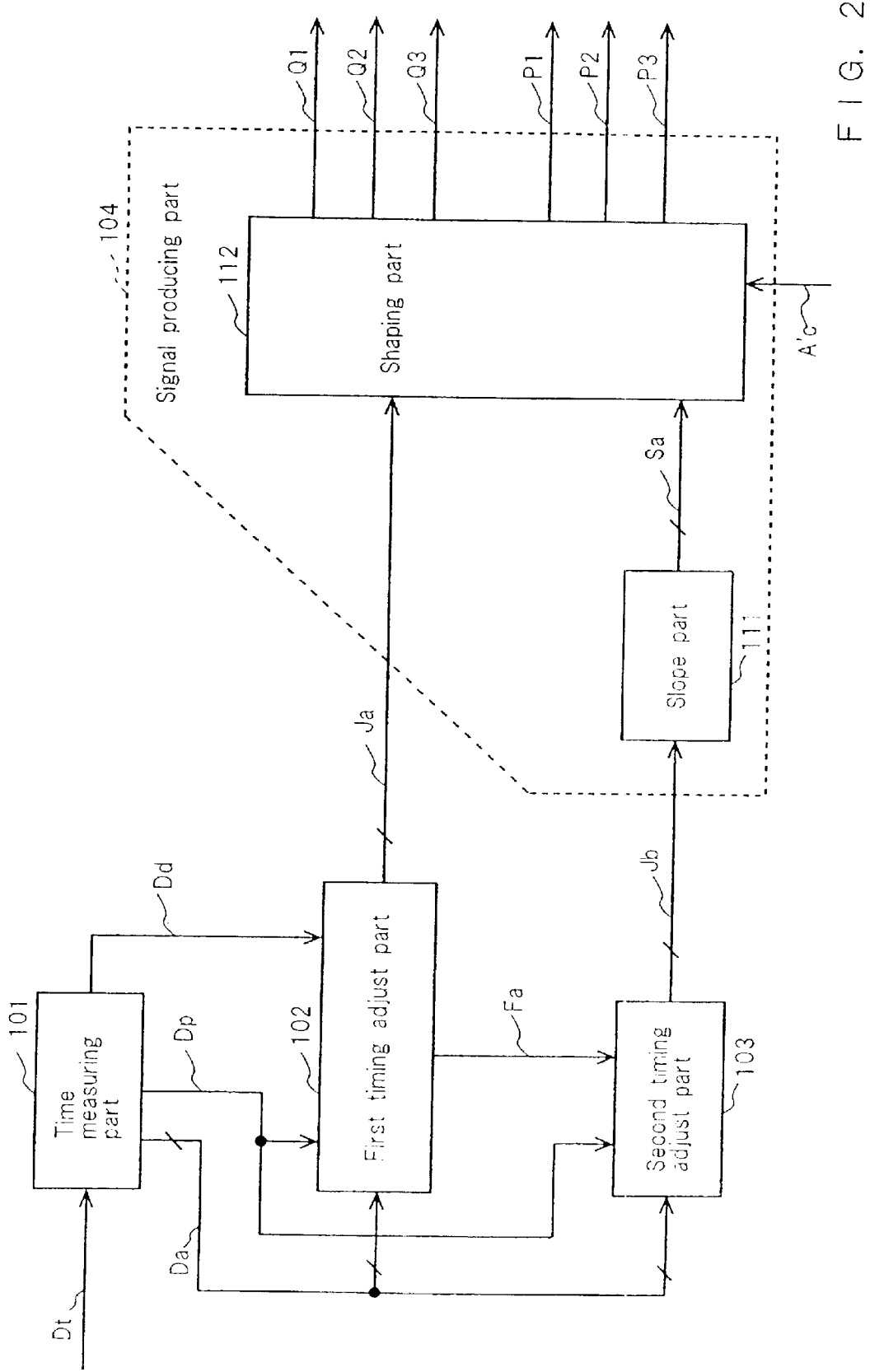
FIG. 2 shows the configuration of an activation control part 31 in accordance with Embodiment 1.

An activation operation block 45 shown in FIG. 1 comprises an activation control part 31. The activation control part 31 outputs three-phase first activation control signals P1, P2, P3 and three-phase second activation control signals Q1, Q2, Q3 in response to the position pulse signal Dt of the position detecting part 30. FIG. 2 shows the detailed configuration of the activation control part 31.

The activation control part 31 shown in FIG. 2 comprises a time measuring part 101, a first timing adjust part 102, a second timing adjust part 103, and a signal producing part 104. The time measuring part 101 measures the time interval T0 corresponding to one period or a half period of the position pulse signal Dt, and outputs a measured data signal Da indicating the measurement result and a measure operation signal Dp. When necessary, the time measuring part 101 outputs a delayed position pulse signal Dd which is a delayed signal of the position pulse signal Dt by a desired time.

On receiving the measure operation signal Dp, the first timing adjust part 102 reads the measured data signal Da, and generates a first timing signal Fa in each first adjust time T1 which responds with the measured data signal Da (the time interval T0). The first timing adjust part 102 further causes a shift of the internal state in response to the first timing signal Fa, and then changes a first state signal in response to the shift of the internal state. The first timing adjust part 102 outputs a first adjust signal Ja in response to at least the first state signal. The first timing adjust part 102 sets the first state signal substantially to a first predetermined state in response to the measure operation signal Dp.

On receiving the measure operation signal Dp, the second timing adjust part 103 reads the measured data signal Da, and generates a second timing signal in each second adjust time T2 which responds with the measured data signal Da (the time interval T0) The second timing adjust part 103 causes a shift of the internal state in response to the second timing signal, and then changes a second state signal in response to the shift of the internal state. The second timing adjust part 103 outputs a second adjust signal Jb in response to the second state signal. The second timing adjust part 103 sets the second state signal substantially to a second predetermined state in response to at least the first timing signal Fa.

The signal producing part 104 comprises a slope part 111 and a shaping part 112. The slope part 111 outputs a slope signal Sa in response to the second adjust signal Jb. The shaping part 112 outputs three-phase first activation control signals P1, P2, P3 and three-phase second activation control signals Q1, Q2, Q3 in response to the first adjust signal Ja and the slope signal Sa (the second adjust signal Jb). The amplitudes of the first activation control signals P1, P2, P3 and the second activation control signals Q1, Q2, Q3 vary in response to the input signal Ac' to the shaping part 112. In this embodiment, the command signal Ac of the commanding part 32 is used as the input signal Ac' to the shaping part 112.

Figure 3:
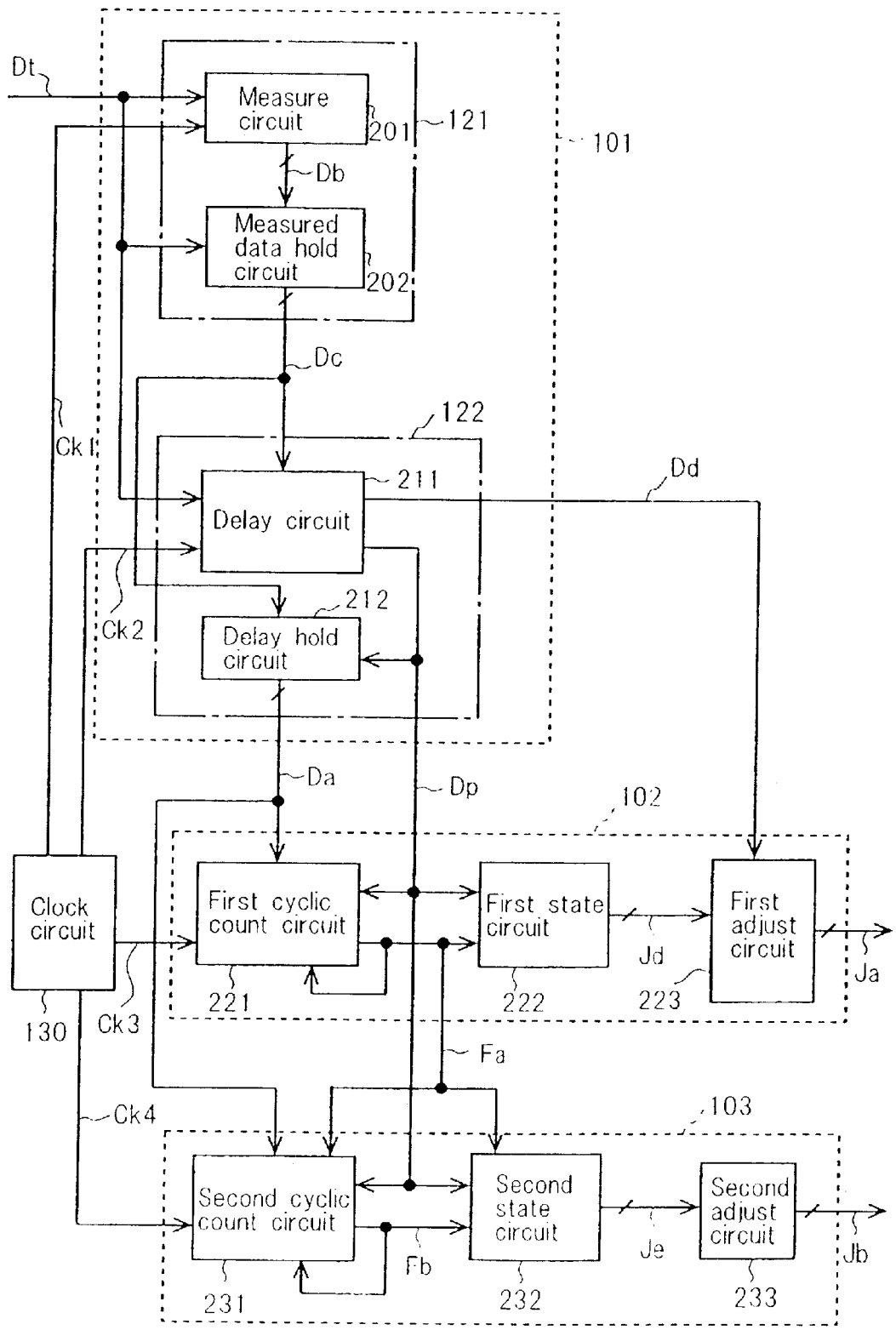
FIG. 3 shows the configuration of a time measuring part 101, a first timing adjust part 102, and a second timing adjust part 103 in accordance with Embodiment 1.

FIG. 3 shows the detailed configuration of the time measuring part 101, the first timing adjust part 102, and the second timing adjust part 103. The time measuring part 101 comprises a measure part 121 and a delay part 122. The measure part 121 comprises a measure circuit 201 for measuring the time interval T0 between the measurement edges of the position pulse signal Dt, and a measured data hold circuit 202 for holding the measurement result. In the measurement of the time interval of one period of the position pulse signal Dt, the measure circuit 201 uses the rising or falling edges of the position pulse signal Dt as the measurement edges, and then measures the time interval T0 between the measurement edges. In this case, the time interval T0 corresponds to one period of the position signal.

On the other hand, in the measurement of the time interval of a half period of the position pulse signal Dt, the measure circuit 201 uses both rising and falling edges of the position pulse signal Dt as the measurement edges, and then measures the time interval T0 between the measurement edges. In this case, the time interval T0 corresponds to a half period of the position signal.

The measure circuit 201 counts up pulses of the first clock signal Ck1 of the clock circuit 130 during the time interval T0 between the measurement edges of the position pulse signal Dt. The measured data hold circuit 202 holds an internal data signal Db of the measure circuit 201 in response to the occurrence of the measuring edge of the position pulse signal Dt. As a result, the output data signal Dc of the measured data hold circuit 202 which is a binary digital data represents the time interval T0 which corresponds to one period or a half period of the position pulse signal Dt. Immediately after the measured data hold circuit 202 holds new data, the measure circuit 201 is reset and then measures next data.

The delay part 122 comprises a delay circuit 211 and a delay hold circuit 212. The delay circuit 211 reads the output data signal Dc of the measure part 121 in response to the occurrence of the measuring edge of the position pulse signal Dt. After that, the delay circuit 211 counts down pulses of the second clock signal Ck2 of the clock circuit 130.

When the internal data of the delay circuit 211 reaches zero (or a predetermined value), the measure operation signal Dp is generated. In response to the occurrence of the measure operation signal Dp, the delay hold circuit 212 reads and holds the output data signal Dc of the measure part 121, and outputs the new measured data signal Da. As a result, the delay part 122 outputs the new measure operation signal Dp and the new measured data signal Da in the timing delayed by a desired delay time Td which is substantially proportional to the measured data (the time interval T0).

The delay circuit 211 of the delay part 122 further outputs a delayed position pulse signal Dd which is a delay signal of the position pulse signal Dt by the time interval Td. The time measuring part 101 can include a part of the clock circuit 130 which outputs the first clock signal Ck1 and the second clock signal Ck2.

The first timing adjust part 102 comprises a first cyclic count circuit 221, a first state circuit 222, and a first adjust circuit 223. The first cyclic count circuit 221 reads the measured data signal Da in response to the measure operation signal Dp, and counts down pulses of the third clock signal Ck3 of the clock circuit 130.

When the internal data of the first cyclic count circuit 221 reaches zero (a predetermined value), a first timing signal Fa is generated. The first cyclic count circuit 221 reads the measured data signal Da again in response to the generation of the first timing signal Fa, and counts down again. As a result, after the generation of the measure operation signal Dp, the first cyclic count circuit 221 outputs a first timing signal Fa in each first adjust time T1 which responds with the measured data signal Da.

The first adjust time T1 is substantially proportional to the time interval T0 of the position pulse signal Dt. In case that the time measuring part 101 measures the time interval T0 of one period of the position pulse signal Dt, the first adjust time T1 of the first timing signal Fa is set to be substantially equal to T0/6. In case that the time measuring part 101 measures the time interval T0 of a half period of the position pulse signal Dt, the first adjust time T1 of the first timing signal Fa is set to be substantially equal to T0/3. The first timing adjust part 102 can includes a part of the clock circuit 130 which outputs the third clock signal Ck3.

The first state circuit 222 includes an up-type counter circuit, for example, and outputs a first state output signal Jd in response to its internal state. The internal state of the first state circuit 222 is set substantially to a first predetermined state in response to the occurrence of the measure operation signal Dp which corresponds to the measurement operation of the time measuring part 101.

After that, the first state circuit 222 counts up by using the first timing signal Fa as a clock signal. The first state circuit 222 changes the internal state in response to the first timing signal Fa, and causes the change and shift of the first state output signal Jd in response to the generation of the first timing signal Fa. That is, the first state output signal Jd changes the state in each first adjust time T1.

In case that the time measuring part 101 measures the time interval of one period of the position pulse signal Dt, the first state circuit 222 changes in six states (twice the number of phases of three) or approximately in six states. In case that the time measuring part 101 measures the time interval of a half period of the position pulse signal Dt, the first state circuit 222 changes in three states (one time the number of phases of three) or approximately in three states. Here, the count value of the first state circuit 222 is limited such that the internal state of the first state circuit 222 does not exceed a predetermined value.

In case that the time measuring part 101 measures the time interval T0 of one period of the position pulse signal Dt, the first adjust circuit 223 outputs a first adjust signal Ja in response to the first state output signal Jd of the first state circuit 222. The first adjust circuit 223 changes the state of the first adjust signal Ja (the first state signal) so that the number of the states of the first adjust signal Ja in the time interval T0 is substantially equal to six (twice the number of the phases of three). In case that the time measuring part 101 measures the time interval T0 of a half period of the position pulse signal Dt, the first adjust circuit 223 outputs a first adjust signal Ja in response to the first state output signal Jd of the first state circuit 222 and the delayed position pulse signal Dd of the delay circuit 211. The first adjust circuit 223 changes the state of the first adjust signal Ja (the first state signal) so that the number of the states of the first adjust signal Ja in the time interval T0 is substantially equal to three (one time the number of the phases of three). As a result, the first adjust signal Ja is a digital signal which responds with at least the first state output signal Jd.

The second timing adjust part 103 comprises a second cyclic count circuit 231, a second state circuit 232, and a second adjust circuit 233. The second cyclic count circuit 231 reads the measured data signal Da in response to the measure operation signal Dp, and counts down pulses of the fourth clock signal Ck4 of the clock circuit 130. When the internal data of the second cyclic count circuit 231 reaches zero (a predetermined value), a second timing signal Fb is generated. The second cyclic count circuit 231 reads the measured data signal Da again in response to the generation of the second timing signal Fb, and counts down again.

As a result, after the generation of the measure operation signal Dp, the second cyclic count circuit 231 outputs a second timing signal Fb in each second adjust time T2 which responds with the measured data signal Da. The second adjust time T2 is substantially proportional to the time interval T0 of the position pulse signal Dt. The second adjust time T2 is sufficiently smaller than the first adjust time T1 (T2<T1/2).

In this embodiment, T2 is set to be approximately T1/10. Besides, in this embodiment, the second cyclic count circuit 231 reads the measured data signal Da also in response to the generation of the first timing signal Fa. This process, however, is carried out only when necessary, and can be omitted. Further, the second timing adjust part 103 can includes a part of the clock circuit 130 which outputs the fourth clock signal Ck4.

The second state circuit 232 includes an up-type counter circuit, for example, and outputs a second state output signal Je in response to its internal state. The internal state of the second state circuit 232 is set substantially to a second predetermined state in response to the occurrence of the first timing signal Fa. Further, the internal state of the second state circuit 232 is set substantially to a second predetermined state also in response to the measure operation signal Dp, when necessary. After that, the second state circuit 232 counts up by using the second timing signal Fb as a clock signal.

The second state circuit 232 changes the internal state in response to the second timing signal Fb, and causes the change and shift of the second state output signal Je. Accordingly, the second state output signal Je is set substantially to a second predetermined state in response to the generation of the first timing signal Fa and the measurement operation of the time measuring part 101, and causes the change and shift of the second state output signal Je in response to the generation of the second timing signal Fb. That is, the second state output signal Je changes the state in each second adjust time T2.

In this embodiment, the second state circuit 232 changes in ten states or approximately in ten states. Further, the count value of the second state circuit 232 is limited such that the internal state of the second state circuit 232 does not exceed a predetermined value.

The second adjust circuit 233 outputs a second adjust signal Jb in response to the second state output signal Je of the second state circuit 232. As a result, the second adjust signal Jb is a digital signal which responds with the second state output signal Je.

Figure 10:
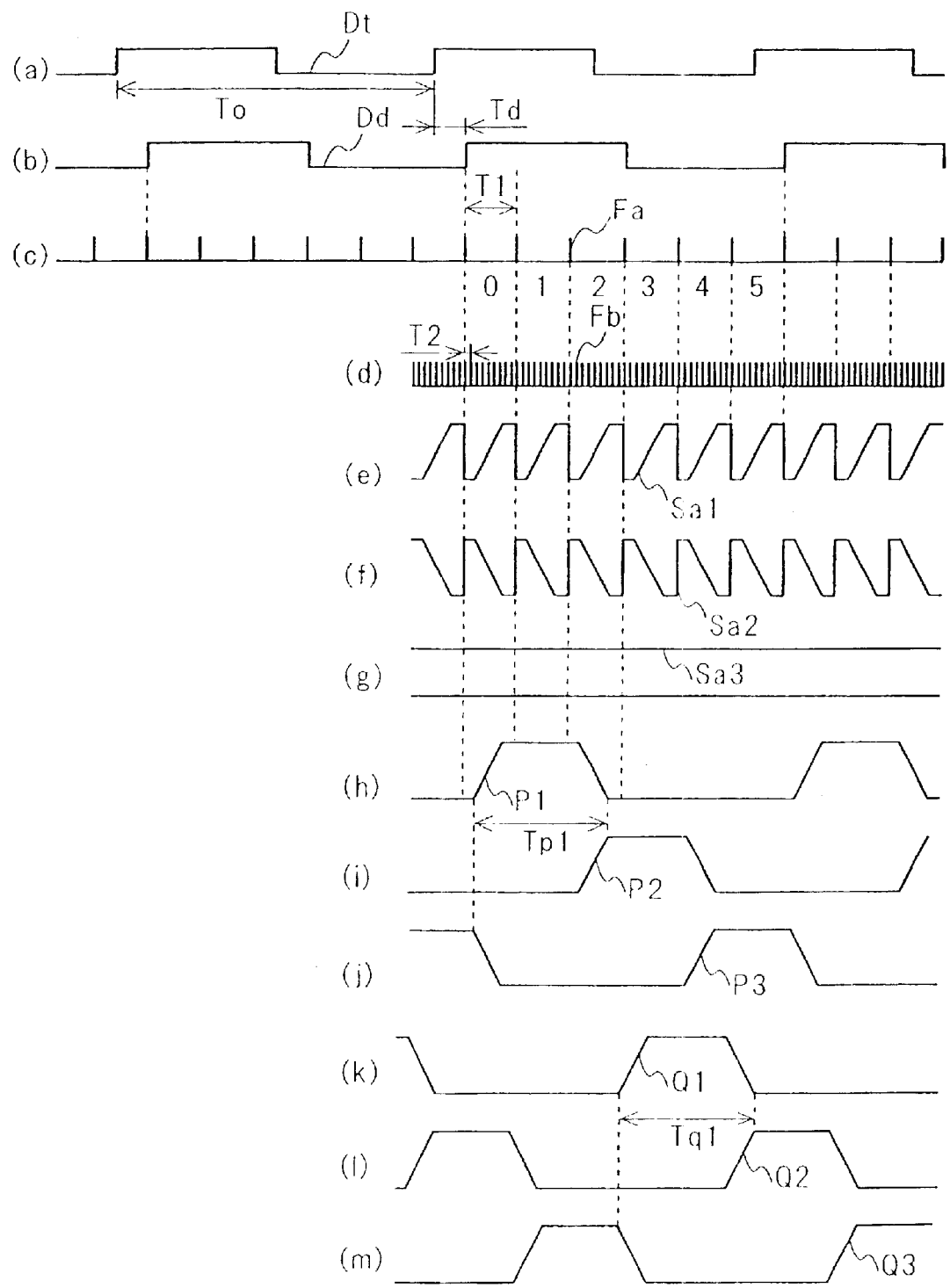
FIG. 10 shows a waveform diagram used for the description of the operation of the activation control part 31 in accordance with Embodiment 1.

FIG. 10 shows a waveform diagram used for the description of the operation of the time measuring part 101, the first timing adjust part 102, and the second timing adjust part 103. The horizontal axis in FIG. 10 indicates time. Described below is the case in which the time measuring part 101 measures one period of the position pulse signal Dt.

The measure part 121 of the time measuring part 101 measures the time interval T0 of one period of the position pulse signal Dt as shown in FIG. 10(a). The delay part 122 of the time measuring part 101 outputs the delayed position pulse signal Dd as shown in FIG. 10(b), which is a delayed signal of the position pulse signal Dt by the time interval Td which is substantially proportional to the measured time interval T0.

The delay part 122 further outputs a measure operation signal Dp in the timing delayed from the measurement edge of the position pulse signal Dt by the delay time Td. The first cyclic count circuit 221 of the first timing adjust part 102 generates a first timing signal Fa as shown in FIG. 10(c) in each first adjust time T1 which responds with the measured time interval T0. The first adjust time T1 is set to be equal or approximately equal to T0/6.

The first state circuit 222 of the first timing adjust part 102 sets the internal state and the first state output signal Jd substantially to a first predetermined state in response to the measure operation signal Dp. The first state circuit 222 further causes the change and shift of the first state output signal Jd in response to the first timing signal Fa which is generated in each first adjust time T1.

The first adjust circuit 223 of the first timing adjust part 102 outputs a first adjust signal Ja which responds with the first state output signal Jd. As a result, the first adjust signal Ja changes in six states or approximately in six states in each period of the position pulse signal Dt or the delayed position pulse signal Dd.

The first adjust signal Ja can change in response to the first state output signal Jd and the delayed position pulse signal Dd. The second cyclic count circuit 231 of the second timing adjust part 103 generates a second timing signal Fb as shown in FIG. 10(d) in each second adjust time T2 which responds with the measured time interval T0. In this embodiment the second adjust time T2 is set to be equal or approximately equal to T1/10.

The second state circuit 232 of the second timing adjust part 103 sets the internal state and the second state output signal Je substantially to a second predetermined state in response to the first timing signal Fa and the measure operation signal Dp. The second state circuit 232 further causes the change of the second state output signal Je in response to the second timing signal Fb which is generated in each second adjust time T2. The second adjust circuit 233 of the second timing adjust part 103 outputs a second adjust signal Jb which responds with the second state output signal Je. As a result, the second adjust signal Jb changes in ten states or approximately in ten states in each period of the first timing signal Fa.

Figure 4:
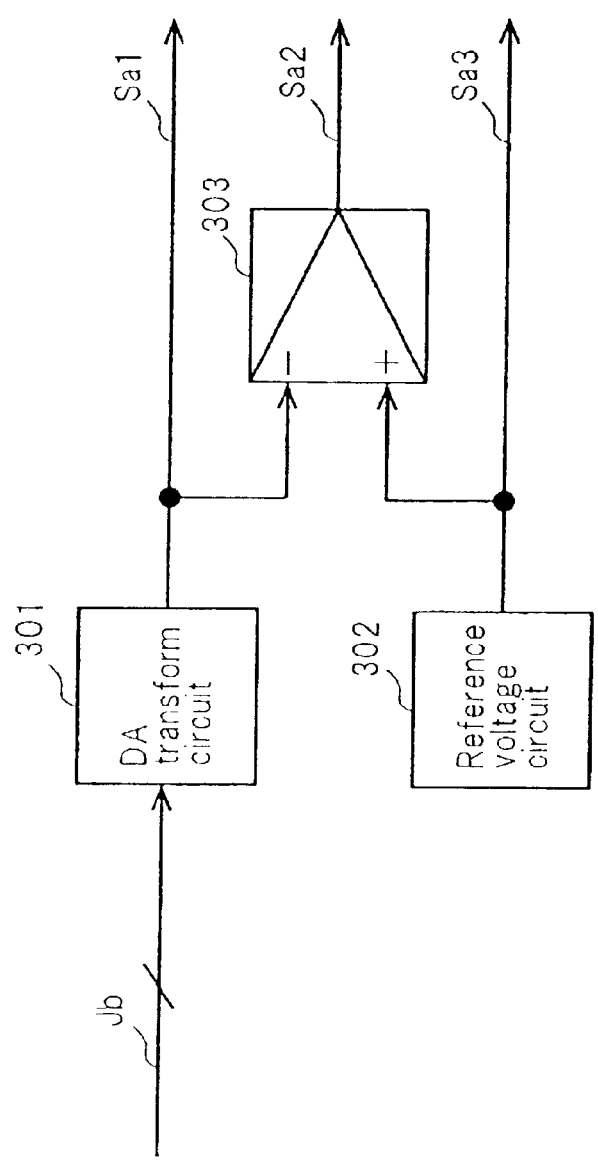
FIG. 4 shows the configuration of a slope part 111 of a signal producing part 104 in accordance with Embodiment 1.

FIG. 4 shows the detailed configuration of the slope part 111 of the signal producing part 104 shown in FIG. 2. The slope part 111 comprises a DA transform circuit 301, a reference voltage circuit 302, and a difference circuit 303. The DA transform circuit 301 outputs a first slope signal Sa1 in response to the second adjust signal Jb of the second timing adjust part 103. FIG. 10(e) shows the waveform of the first slope signal Sa1. Since the second adjust signal Jb is set to a second predetermined state in response to the first timing signal Fa, the first slope signal Sa1 is set to zero (a predetermined value). During the time when the second adjust signal Jb is lower than a first predetermined value, the first slope signal Sa1 remains zero. Then, with the increase of the second adjust signal Jb, the DA transform circuit 301 increases the amplitude of the first slope signal Sa1 in proportional to the second adjust signal Jb.

The DA transform circuit 301 keeps the first slope signal Sa1 constant (a reference voltage) after the first slope signal Sa1 reaches the reference voltage. As a result, the first slope signal Sa1 is an analogue signal having a slope in synchronization with the first timing signal Fa. The reference voltage circuit 302 outputs a third slope signal Sa3 which is a constant voltage equal to the reference voltage. The third slope signal Sa3 having no slope may not be called a slope signal in strict sense. In this embodiment, however, the third slope signal Sa3 is also included in the category of slope signals in order to classify those signals as a group.

The difference circuit 303 obtains the difference between the third slope signal Sa3 and the first slope signal Sa1, and outputs a second slope signal Sa2. FIGS. 10(f) and 10(g) show the waveforms of the second slope signal Sa2 and the third slope signal Sa3.

The slope part 111 produces at least a slope signal Sa1 whose cyclic interval T1 (the first adjust time T1) is substantially proportional to the time interval T0 of the time measuring part 101. The slope signal Sa1 repeats a slope waveform substantially a plural times (at least three times) during the time interval T0 (the one period of the position pulse signal).

The shaping part 112 of the signal producing part 104, shown in FIG. 2, produces three-phase first activation control signals P1, P2, and P3 and three-phase second activation control signals Q1, Q2, and Q3. Each of the three-phase first activation control signals P1, P2, and P3 and the three-phase second activation control signals Q1, Q2, and Q3 responds with the first adjust signal Ja of the first timing adjust part 102 and the second adjust signal Jb of the second timing adjust part 103.

Figure 5:
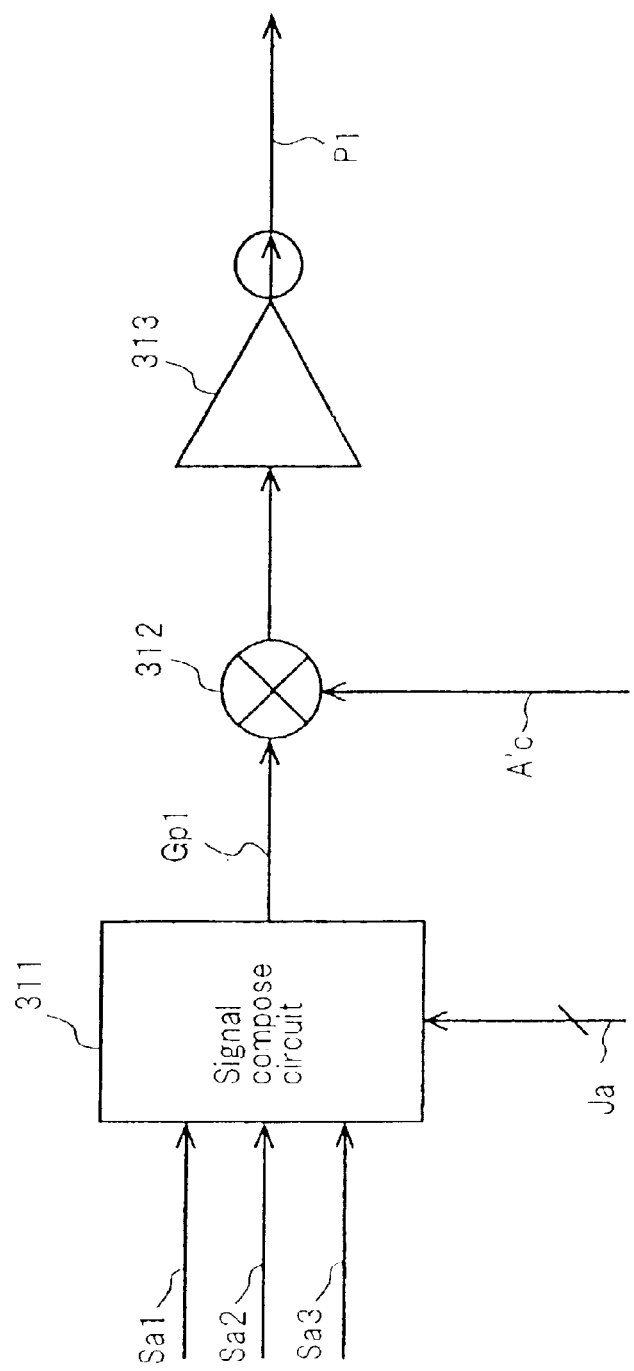
FIG. 5 shows the partial configuration of a shaping part 112 of the signal producing part 104 in accordance with Embodiment 1.

FIG. 5 shows the detailed configuration of a shaping circuit (a part of the shaping part 112) which produces the first activation control signal P1. The shaping circuit which is a part of the shaping part 112 comprises a signal compose circuit 311, a multiply circuit 312, and a current convert circuit 313.

The signal compose circuit 311 combines the first slope signal Sa1, the second slope signal Sa2, and the third slope signal Sa3 of the slope part 111 in response to the first adjust signal Ja of the first timing adjust part 102 so as to produce composite signals. The signal compose circuit 311 produces a composite signal Gp1 which has a trapezoidal shape. The multiply circuit 312 multiplies the composite signal Gp1 by the input signal Ac'. In this embodiment, since the input signal Ac' is a command signal Ac of the commanding part 32, the output signal of the multiply circuit 312 is the product of the composite signal Gp1 and the command signal Ac. The current convert circuit 313 outputs a first activation control signal P1 which is a current signal substantially proportional to the output signal of the multiply circuit 312. As a result, the first activation control signal P1 responds with the first adjust signal Ja (first state output signal Jd) of the first timing adjust part 102 and the second adjust signal Jb (second state output signal Je) of the second timing adjust part 103.

The first activation control signal P1 has a trapezoidal shape which is produced by the composition of the slope signals Sa1, Sa2, and Sa3 in response to the first adjust signal Ja. The other shaping circuits in the shaping part 112 for generating the other first activation control signals P2, P3 and second activation control signals Q1, Q2, Q3 have the same detailed configuration as that shown in FIG. 5, and hence description is omitted.

The shaping part 112 produces at least an activation control signal which varies substantially smoothly in at least one of rising and falling slopes responding with the slope signal Sa1. In this case, the shaping part 112 produces the three-phase first activation control signals and the three-phase second activation control signals, each of which varies substantially smoothly in both of the rising and falling slopes. Each of the three-phase first activation control signals and the three-phase second activation control signals has a cyclic interval which is substantially equal to one period of the position signal.

FIG. 10(h) shows the waveform of the first activation control signal P1. The first activation control signal P1 is a trapezoidal current signal whose amplitude varies in response to the command signal Ac. The active period Tp1 of the first activation control signal P1 is an electrical angle which is larger than 360/3=120 electrical degrees. FIGS. 10(i) and 10(j) show the waveforms of the other first activation control signals P2 and P3.

As such, the three-phase first activation control signals P1, P2, and P3 are current signals which responds with the first adjust signal Ja of the first timing adjust part 102 and the second adjust signal Jb of the second timing adjust part 103. Each of the three-phase first activation control signals P1, P2, and P3 has a trapezoidal shape which is produced by the composition of the slope signals Sa1, Sa2, and Sa3 in response to the first adjust signal Ja. The active periods Tp1, Tp2, and Tp3 of the three-phase first activation control signals P1, P2, and P3 are substantially longer than the period of 120 electrical degrees. In this embodiment, Tp1, Tp2, and Tp3 are in the range from 150 to 180 degrees.

FIGS. 10(k)–10(m) show the waveforms of the three-phase second activation control signals Q1, Q2, Q3. The three-phase second activation control signals Q1, Q2, Q3 are current signals which responds with the first adjust signal Ja of the first timing adjust part 102 and the second adjust signal Jb of the second timing adjust part 103. Each of the three-phase second activation control signals Q1, Q2, Q3 has a trapezoidal shape which is produced by the composition of the slope signals Sa1, Sa2, and Sa3 in response to the first adjust signal Ja. The active periods Tq1, Tq2, and Tq3 of the three-phase second activation control signals Q1, Q2, Q3 are substantially longer than 120 electrical degrees. In this embodiment, Tq1, Tq2, and Tq3 are in the range from 150 to 180 degrees.

The first activation control signal P1 and the second activation control signal Q1 are in the reversed phase (phase difference of the electrical angle of 180 degrees) to each other. Similarly, the first activation control signal P2 and the second activation control signal Q2 are in the reversed phase, while the first activation control signal P3 and the second activation control signal Q3 are in the reversed phase.

Figure 6:
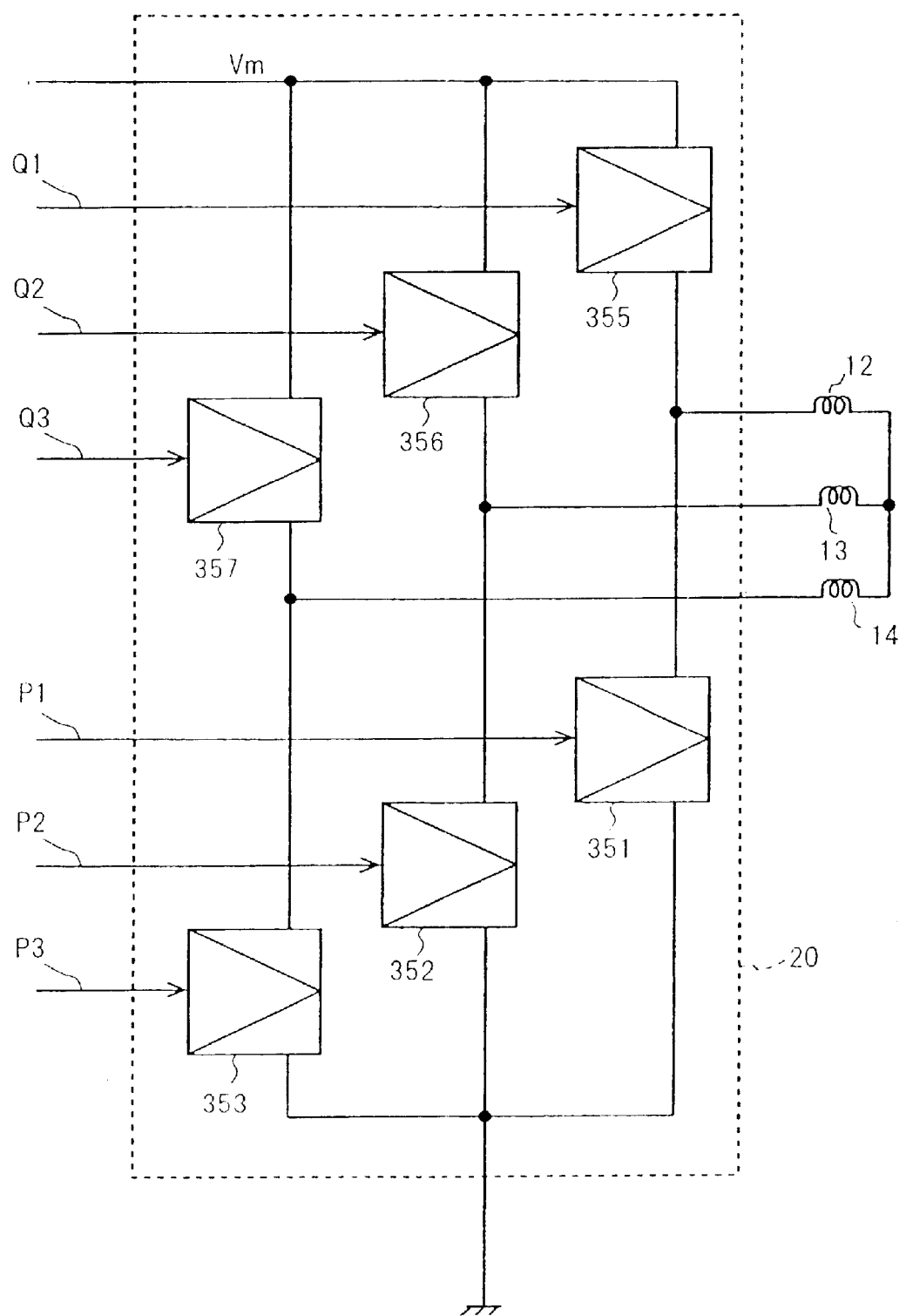
FIG. 6 shows the configuration of a power supplying part 20 in accordance with Embodiment 1.

The power supplying part 20 shown in FIG. 1 alters current paths to the three-phase windings 12, 13, and 14 in response to the three-phase first activation control signals P1, P2, P3 and the three-phase second activation control signals Q1, Q2, Q3 of the activation control part 31. FIG. 6 shows the detailed configuration of the power supplying part 20. The power supplying part 20 shown in FIG. 6 comprises three first power amplifying parts 351, 352, 353 and three second power amplifying parts 355, 356, 357.

The first power amplifying part 351 comprises a first power transistor for forming a current path from the negative output terminal side of the voltage supplying part 25 to the power supply terminal side of the winding 12. The first power amplifying part 351 outputs the drive voltage signal V1 and the drive current signal I1 by amplifying the first activation control signal P1. Similarly, the first power amplifying part 352 comprises a first power transistor for forming a current path from the negative output terminal side of the voltage supplying part 25 to the power supply terminal side of the winding 13. The first power amplifying part 352 outputs the drive voltage signal V2 and the drive current signal I2 by amplifying the first activation control signal P2.

Figure 7:
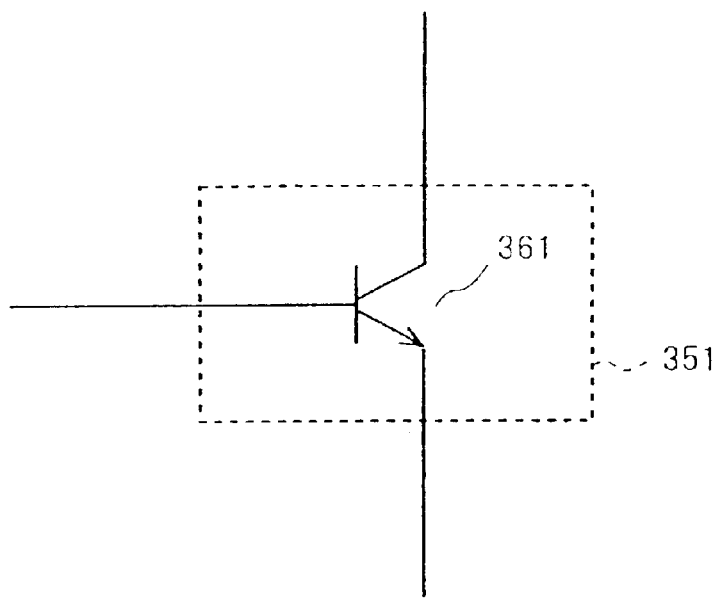
FIG. 7 shows the circuit of a first power amplifying part 351 in accordance with Embodiment 1.

Further, the first power amplifying part 353 comprises a first power transistor for forming a current path from the negative output terminal side of the voltage supplying part 25 to the power supply terminal side of the winding 14. The first power amplifying part 353 outputs the drive voltage signal V3 and the drive current signal I3 by amplifying the first activation control signal P3. FIG. 7 shows an example of the detailed configuration of the first power amplifying part 351. This first power amplifying part 351 is composed of an NPN-type bipolar first power transistor 361. The NPN-type bipolar first power transistor 361 amplifies the current input to the base terminal and output a amplified signal.

The second power amplifying part 355 comprises a second power transistor for forming a current path from the positive output terminal side of the voltage supplying part 25 to the power supply terminal side of the winding 12. The second power amplifying part 355 outputs the drive voltage signal V1 and the drive current signal I1 by amplifying the second activation control signal Q1. Similarly, the second power amplifying part 356 comprises a second power transistor for forming a current path from the positive output terminal side of the voltage supplying part 25 to the power supply terminal side of the winding 13. The second power amplifying part 356 outputs the drive voltage signal V2 and the drive current signal I2 by amplifying the second activation control signal Q2.

Figure 8:
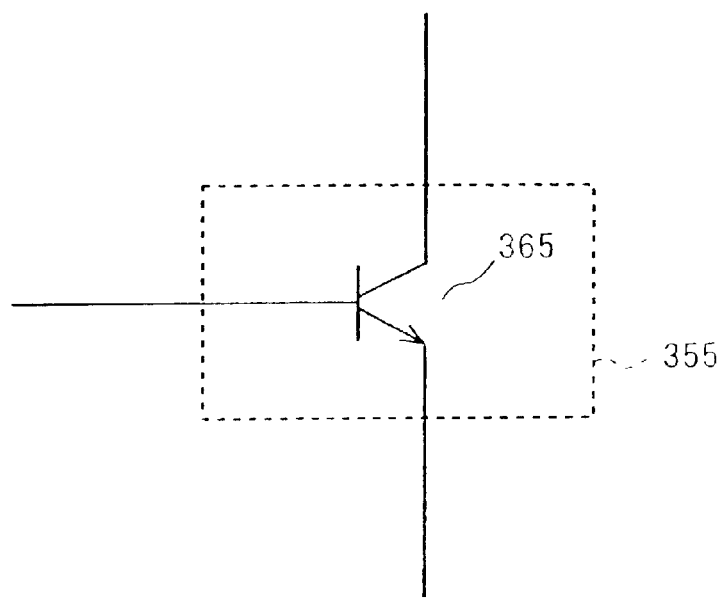
FIG. 8 shows the circuit of a second power amplifying part 355 in accordance with Embodiment 1.

Further, the second power amplifying part 357 comprises a second power transistor for forming a current path from the positive output terminal side of the voltage supplying part 25 to the power supply terminal side of the winding 14. The second power amplifying part 357 outputs the drive voltage signal V3 and the drive current signal I3 by amplifying the second activation control signal Q3. FIG. 8 shows an example of the detailed configuration of the second power amplifying part 355. This second power amplifying part 355 is composed of an NPN-type bipolar second power transistor 365. The NPN-type bipolar first power transistor 365 amplifies the current input to the base terminal and output a amplified signal.

The overall operation is described below. The position sensor 41 detects the rotational position of the magnetic poles of the field part of the rotor 11 which directly drives the disk 1. The position detecting part 30 outputs a position pulse signal Dt by shaping the output signal of the position sensor 41. The activation control part 31 of the activation operation block 45 measures the time interval T0 of one period or a half period of the position pulse signal Dt, and outputs a first timing signal Fa which responds with the measurement result in each first adjust time T1 and a second timing signal Fb in each second adjust time T2. The first adjust time T1 and the second adjust time T2 are substantially proportional to the time interval T0. Practically, the first adjust time T1 is approximately ⅙ or ⅓ of T0, and the second adjust time T2 is approximately 1/60 or 1/30 of T0.

The first state output signal Jd and the first adjust signal Ja change and shift in each first adjust time T1 in response to the first timing signal Fa. In this embodiment, the first state output signal Jd and the first adjust signal Ja change and shift approximately in six or three states during the time interval T0. The second state output signal Je and the second adjust signal Jb change and shift in each second adjust time T2 in response to the second timing signal Fb. In this embodiment, the second state output signal Je and the second adjust signal Jb change and shift approximately in ten states during the time interval T1. The slope signals Sa1, Sa2, and Sa3 which has at least a slope are produced in response to the second adjust signal Jb. The slope signals Sa1, Sa2, and Sa3 are combined in response to the first adjust signal Ja so as to produce the six composite signals which vary smoothly in the rising and falling slopes in response to the slope signals.

The three-phase first activation control signals P1, P2, and P3 and the three-phase second activation control signals Q1, Q2, and Q3 which responds with the six composite signals are produced. Each of the three-phase first activation control signals varies smoothly at least in one of the rising and falling slopes in response to the slope signals. Each of the three-phase second activation control signals varies smoothly at least in one of the rising and falling slopes in response to the slope signals. The three first power amplifying parts 351, 352, and 353 of the power supplying part 20 amplify the three-phase first activation control signals P1, P2, and P3, and supply the negative parts of the drive current signals I1, I2, and I3 to the three-phase windings 12, 13, and 14. The three second power amplifying parts 355, 356, and 357 of the power supplying part 20 amplify the three-phase second activation control signals Q1, Q2, and Q3, and supply the positive parts of the drive current signals I1, I2, and I3 to the three-phase windings 12, 13, and 14.

As a result, each of the three-phase drive current signals I1, I2, and I3 has smooth rising and falling slopes. The three-phase drive current signals I1, I2, and I3 to the three-phase windings 12, 13, and 14 are synchronized with the rotation of the disk 1 and the rotor 11 by using a position signal of the position detecting part 30. This reduces substantially the pulsation of the generated drive force, and hence reduces the vibration and the acoustic noise of the disk 1. As a result, a disk drive apparatus suitable for recording and/or reproducing a high-density disk is realized.

The commanding part 32 detects the rotational speed of the disk 1 and the rotor 11 on the basis of the one period or a half period of the position pulse signal Dt. The commanding part 32 compares the actual rotational speed with the aimed speed, and outputs a command signal Ac which is a speed control voltage responding with the comparison result. Each of the amplitudes of the three-phase first activation control signals P1, P2, and P3 and Each of the amplitudes of the three-phase second activation control signals Q1, Q2, and Q3 vary in response to the command signal Ac. Accordingly, the drive current signals I1, I2, and I3 to the windings 12, 13, and 14 are controlled in response to the command signal Ac, and the rotational speed of the disk 1 and rotor 11 is accurately controlled.

In this embodiment, the alteration of current paths to the three-phase windings is executed on the basis of a single position signal. Accordingly, the rotation of the disk and the rotor is achieved by using a single position sensor so that the disk drive apparatus and the motor can have a simple and low-cost configuration. The time measuring part measures the time interval T0 of the single position signal. The first timing part produces the first timing signal in each first adjust time T1 which responds with the time interval T0 of the time measuring part. The first timing part changes and shifts the first state signal (first state output signal, first adjust signal, and the like) in response to the first timing signal.

The second timing part produces the second timing signal in each second adjust time T2 which responds with the time interval T0 of the position signal. The second timing part produces the second state signal (second state output signal, second adjust signal, and the like) in response to the second timing signal. The signal producing part produces at least a slope signal which responds with the second state signal, and the slope signal has substantially a smooth slope. The activation operation part produces at least an activation control signal which responds with the first state signal and the second state signal, and alters current paths to the three-phase windings smoothly in an accurate timing.

In particular, the activation operation part can easily produce the activation control signal which has at least a smooth slope (at least in one of the rising and falling slopes among the rising slope, the flat top, and the falling slope) in response to the first state signal and the slope signal. As a result, the three-phase drive current signals to the three-phase windings are altered smoothly in response to the activation control signal. Then, the pulsation of the generated drive force is remarkably reduced. The disk drive apparatus reduces the disk vibration and the acoustic noise of the disk and is much suitable for recording on and reproducing from a high-density disk.

Further, since the first adjust time T1 is much longer than the second adjust time T2, the bit length of the first cyclic count circuit of the first timing adjust part is much longer than the bit length of the second cyclic count circuit of the second timing adjust part. Accordingly, the effective bit length of the first adjust time T1 becomes much longer than the effective bit length of the second adjust time T2, and the first timing signal can be produced in an accurate timing. That is, even in case of high-speed rotation of the disk, the effective bit length of the first adjust time T1 is long enough to reduce the influence of a bit error. Therefore, the activation operation part produces the three-phase first activation control signals and the three-phase second activation control signals in accurate timings in response to the single position signal.

Further, since the second timing signal of the second timing adjust part is used only for producing the slope signal, a bit error of the second adjust time T2 makes few influence to the first activation control signals. Since the first adjust time T1 and the second adjust time T2 are substantially proportional to the time interval T0 of the position signal, the current paths to the three-phase windings can be smoothly altered in accurate timings even when the disk rotational speed is changed. Accordingly, even in case that the aimed speed is changed inversely proportional to the disk radius in response to the position of the head part, the current paths to the three-phase windings can be always altered in accurate timings in response to the position signal. Therefore, the disk drive apparatus and the motor can drive the disk accurately and achieve an excellent speed control of the disk.

The first state signal of the first timing adjust part is set substantially to a first predetermined state in response to the, measurement operation of the position signal by the time measuring part. So the first state signal is synchronized to the position signal so that the activation control signals become in phase to the rotational position of the rotor. Accordingly, even in case of acceleration or deceleration of the disk, the current paths to the three-phase windings are always altered in accurate phases.

Further, the second state signal of the second timing adjust part is set substantially to a second predetermined state in response to the changing operation of the first state signal caused by the generation of the first timing signal. So the slope signal and the second state signal are synchronized to the first timing signal so that the slope portions of the activation control signals become in phase to the rotational position of the rotor. As a result, the slopes of the activation control signals can be produced in synchronization with the rotational position of the rotor so that the rotor is smoothly driven.

Further, a desired delay time Td is provided in response to the measurement result of the position signal. A measure operation signal Dp is produced at the delay time Td after the generation of the detection edge of the position signal, then the first state signal of the first timing adjust part is set to a first predetermined state in response to the measure operation signal.

As a result, a phase difference can be provided in the phase of the actual alternation operation relative to the phase of the position signal. So the relative arrangement between the position sensor 41 and the, three-phase windings 11, 12, and 13 can be freely shifted in response to the phase difference related to the delay time Td. In other words, this permits a larger freedom in the design of the motor structure and permits an optimum arrangement.

[Embodiment 2]

Figure 11:
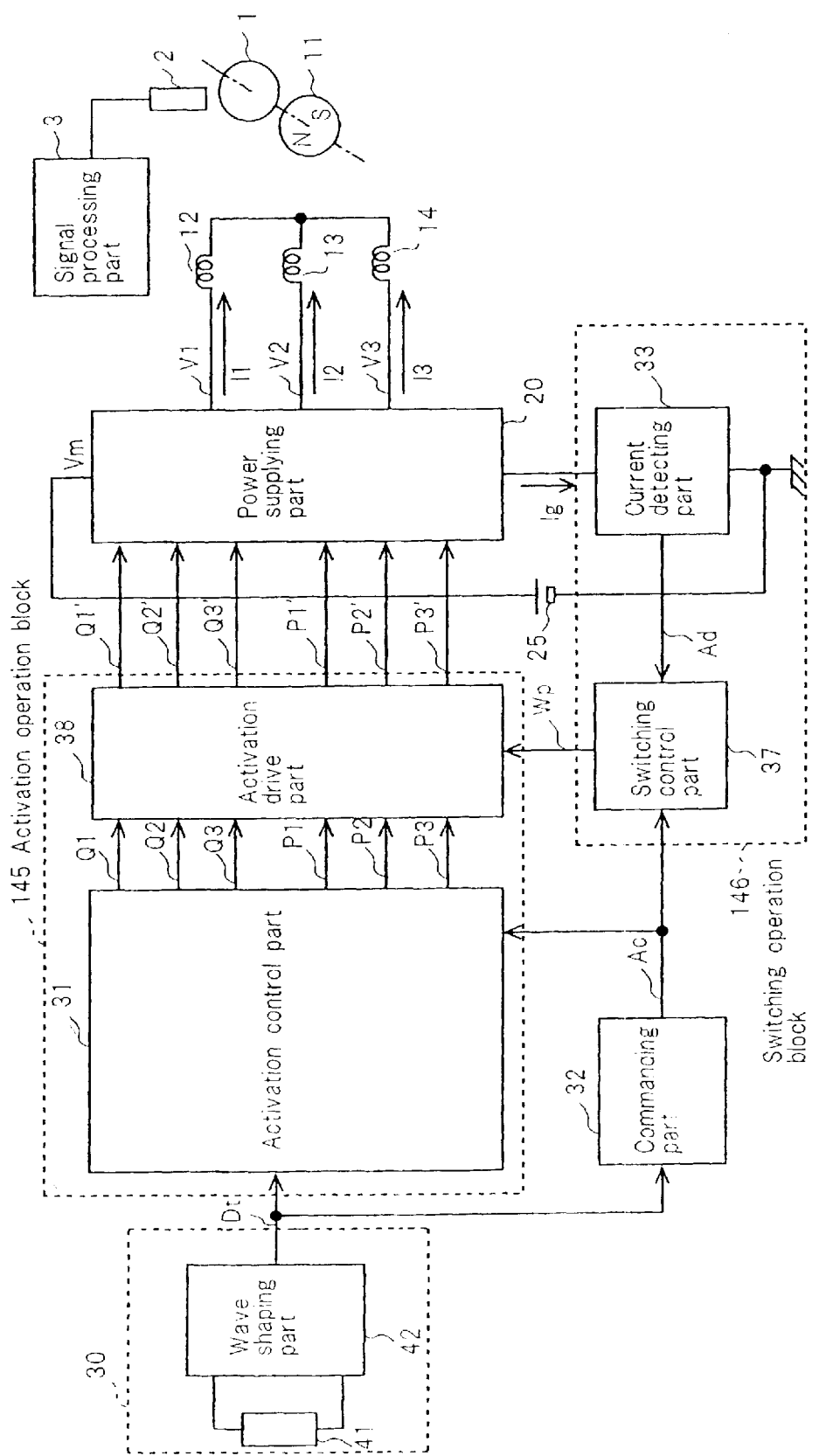
FIG. 11 shows the overall configuration in accordance with Embodiment 2 of the invention.

FIGS. 11–14 show: a disk drive apparatus comprising a motor in accordance with Embodiment 2 of the invention; and a motor which is suitable to be used in a disk drive apparatus. FIG. 11 shows the overall configuration. The present embodiment includes a current detecting part 33, a switching control part 37, and an activation drive part 38. The activation control part 31 and the activation drive part 38 constitute an activation operation block 145, and the current detecting part 33 and the switching control part 37 constitute a switching operation block 146. Components similar to the foregoing Embodiment 1 are designated by the same numerals, and detailed description thereof is omitted.

The power supplying part 20 comprises three first power amplifying parts and three second power amplifying parts (see FIG. 6), and alters current paths to the three-phase windings 12, 13, and 14 according to the rotation of the disk 1 and the rotor 11. The first power amplifying part shown in FIG. 7 can be used in this embodiment, but another preferable configuration of the first power amplifying part is shown in FIG. 12.

Figure 12:
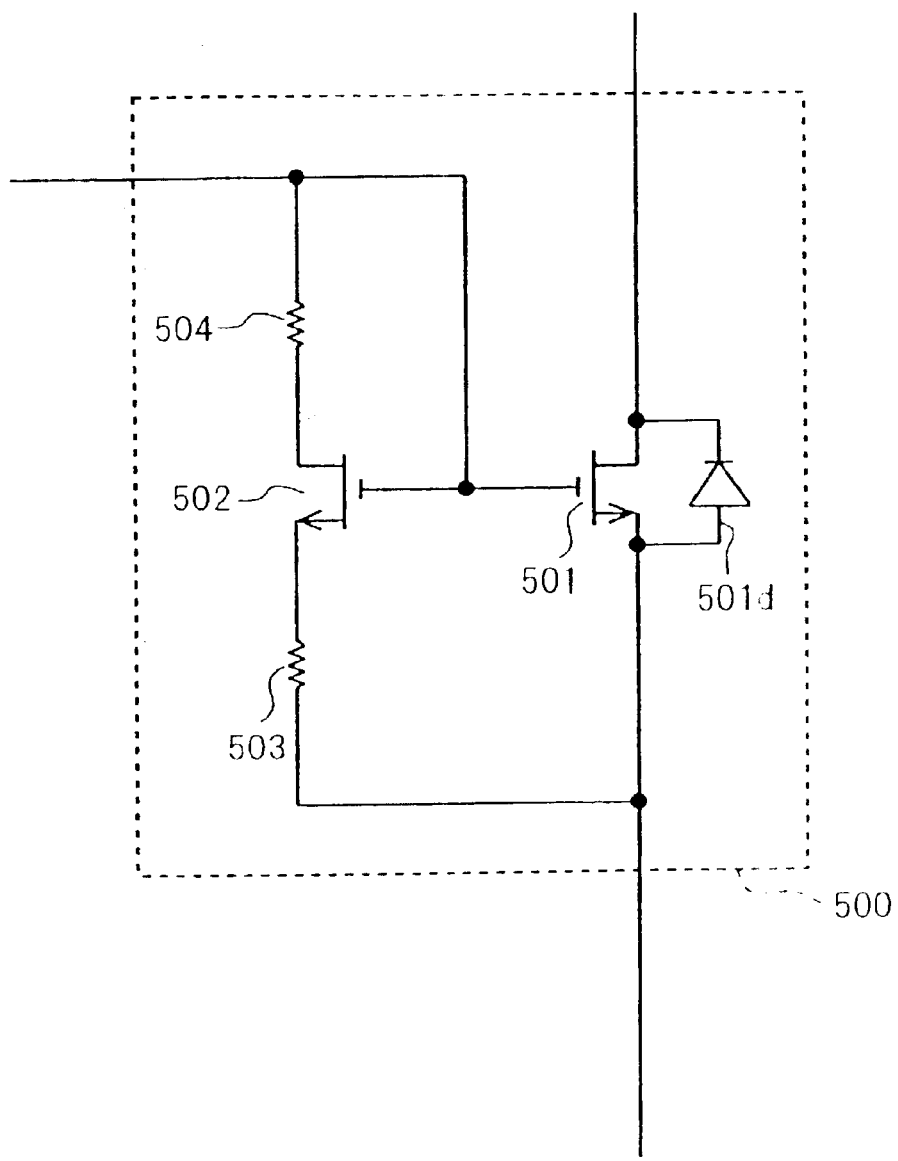
FIG. 12 shows the circuit of a first power amplifying part 500 in accordance with Embodiment 2.

The first power amplifying part 500 shown in FIG. 12 comprises a first FET power transistor 501, a first power diode 501d, an FET transistor 502, and resistors 503 and 504. The first FET power transistor 501 is an N-channel MOS-type FET power transistor (an NMOS-FET transistor). The first power diode 501d is formed by a parasitic diode which is connected in the reverse direction from the current flow-out terminal side to the current flow-in terminal side of the transistor. The first FET power transistor 501 and the FET transistor 502 constitute an FET power current-mirror circuit, and the FET power current-mirror circuit amplifies the input current at the control terminal side by a predetermined amplification (the factor of 100, for example).

The resistors 503 and 504 are inserted when necessary to improve the amplification characteristics of the FET power current-mirror circuit. In other words, both or one or none of the resistors 503 and 504 can be inserted.

Figure 13:
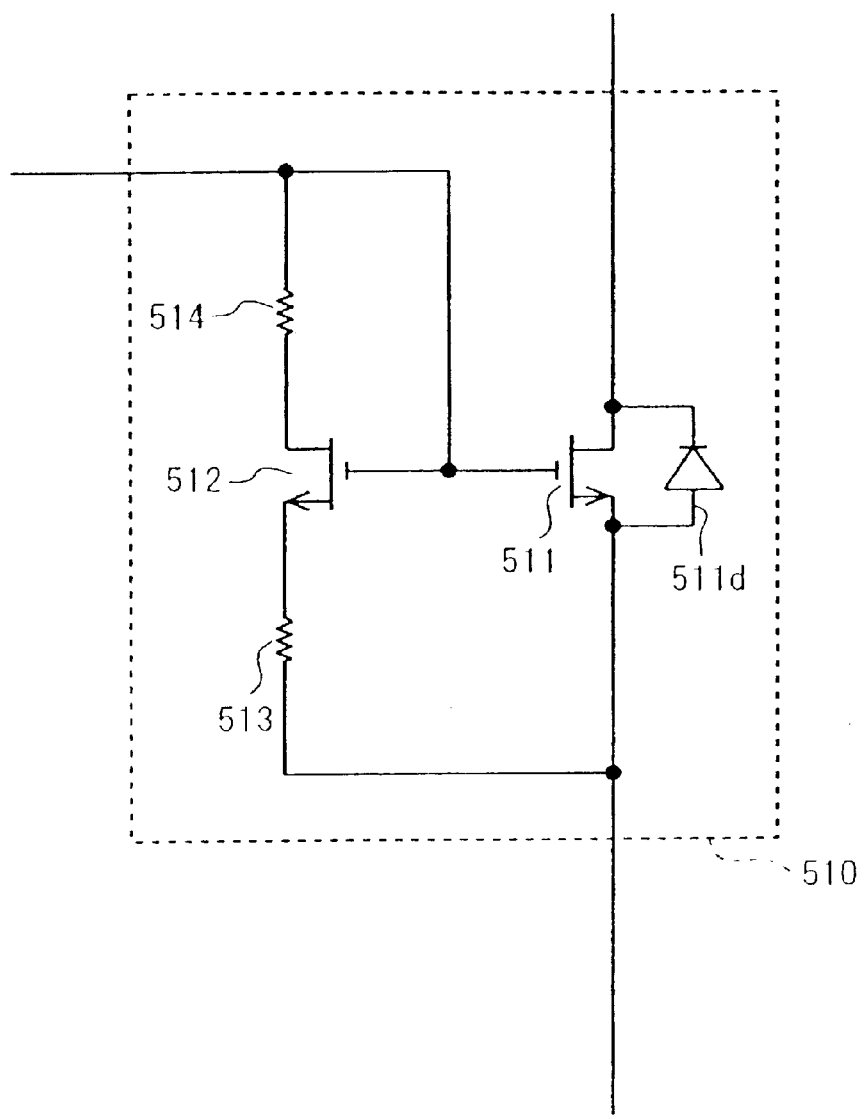
FIG. 13 shows the circuit of a second power amplifying part 510 in accordance with Embodiment 2.

The second power amplifying part shown in FIG. 8 can be used in this embodiment, but another preferable configuration of the second power amplifying part is shown in FIG. 13. The second power amplifying part 510 shown in FIG. 13 comprises a second FET power transistor 511, a second power diode 511d, an FET transistor 512, and resistors 513 and 514. The second FET power transistor 511 is an N-channel MOS-type FET power transistor (an NMOS-FET transistor).

The second power diode 511d is formed by a parasitic diode which is connected in the reverse direction from the current flow-out terminal side to the current flow-in terminal side of the transistor. The second FET power transistor 511 and the FET transistor 512 constitute an FET power current-mirror circuit, and the FET power current-mirror circuit amplifies the input current at the control terminal side by a predetermined amplification (the factor of 100, for example). The resistors 513 and 514 are inserted when necessary so as to improve the amplification characteristics of the FET power current-mirror circuit. In other words, both or one or none of the resistors 513 and 514 can be inserted.

The current detecting part 33. of the switching operation block 146 shown in FIG. 11 detects the conducted current or the composed supply current Ig to the three-phase windings 12, 13, and 14 from the voltage supplying part 25 through the three first power amplifying parts of the power supplying part 20. The current detecting part 33 outputs a current detection signal Ad which responds with the conducted current or the composed supply current Ig.

The composed supply current Ig corresponds to a composite value of the negative parts of the three-phase drive current signals I1, I2, and I3 to the three-phase windings 12, 13, and 14. The switching control part 37 compares the current detection signal Ad of the current detecting part 33 with the command signal Ac of the commanding part 32, and outputs a switching pulse signal Wp which is a high frequency PWM signal in response to the comparison result.

The activation drive part 38 of the activation operation block 145 shown in FIG. 11 receives: the three-phase first activation control signals P1, P2, and P3 and the three-phase second activation control signals Q1, Q2, and Q3 of the activation control part 31; and the switching pulse signal Wp of the switching control part 37.

Figure 14:
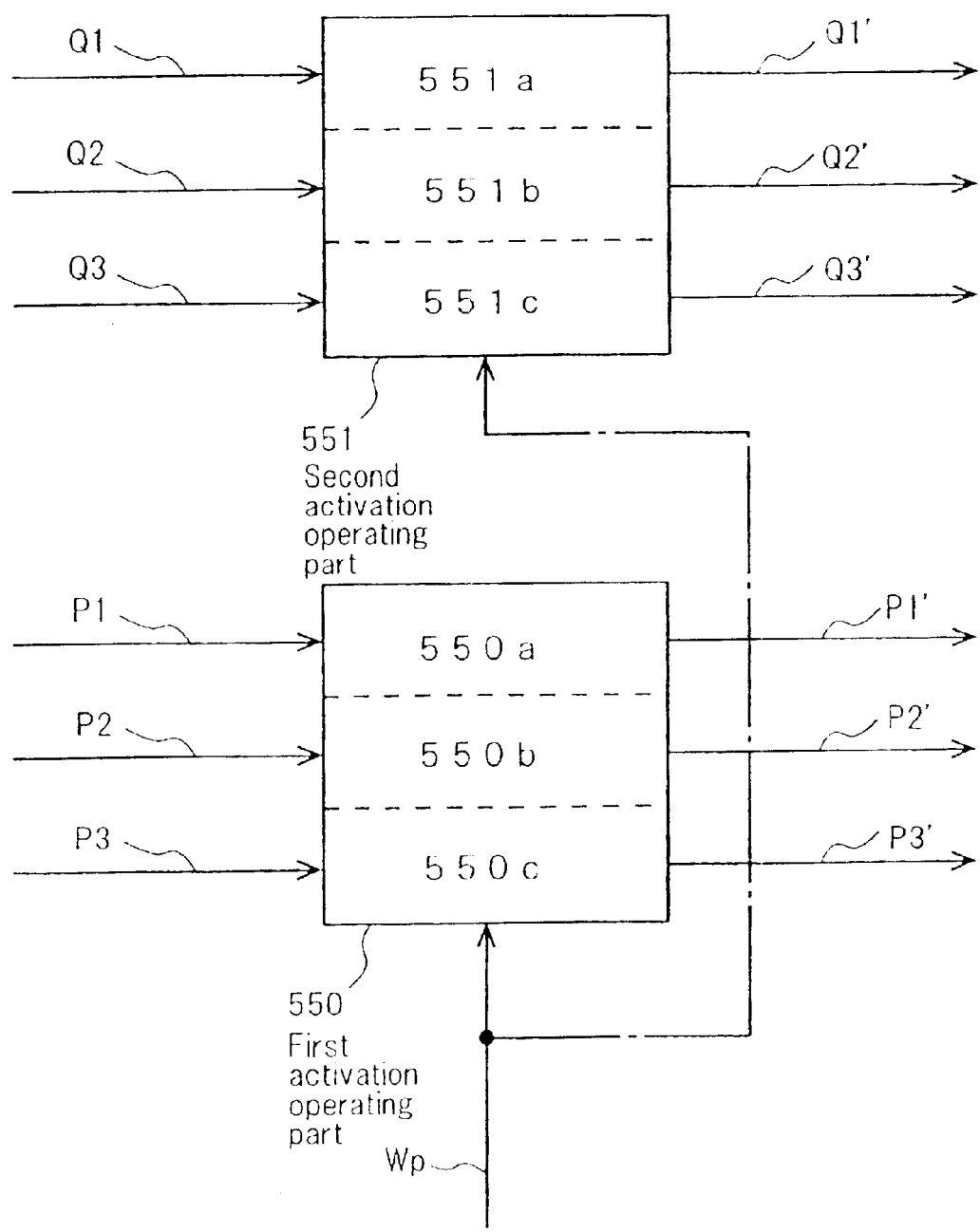
FIG. 14 shows the configuration of an activation drive part 38 in accordance with Embodiment 2.

The activation drive part 38 converts the three-phase first activation control signals P1, P2, and P3 and/or the three-phase second activation control signals Q1, Q2, and Q3 into high-frequency pulses in response to the switching pulse signal Wp, and produces three-phase third activation control signals P1', P2', and P3' and three-phase fourth activation control signals Q1', Q2', and Q3'. FIG. 14 shows the detailed configuration of the activation drive part 38.

The activation drive part 38 shown in FIG. 14 comprises a first activation operating part 550 and a second activation operating part 551. A first activation operating circuit 550a of the first activation operating part 550 produces the third activation control signal P1' by converting the first activation control signal P1 into pulses in response to the switching pulse signal Wp. The third activation control signal P1' becomes a current signal which has a value substantially proportional to the first activation control signal P1 when the switching pulse signal Wp is "H" (the high potential state).

On the other hand, when the switching pulse signal Wp is "L" (the low potential state), the third activation control signal P1' becomes a zero current or an OFF current regardless of the value of the first activation control signal P1. Similarly, a first activation operating circuit 550b of the first activating operation part 550 produces the third activation control signal P2' by converting the first activation control signal P2 into pulses in response to the switching pulse signal Wp.

Further, a first activation operating circuit 550c of the first activation operating part 550 produces the third activation control signal P3' by converting the first activation control signal P3 into pulses in response to the switching pulse signal Wp. That is, the three-phase third activation control signals P1', P2', and P3' are three-phase current pulse signals which responds with the three-phase first activation control signals P1, P2, and P3 and are simultaneously converted into pulses in response to the single switching pulse signal Wp.

A second activation operating circuit 551a of the second activation operating part 551 produces the fourth activation control signal Q1' which has a value substantially proportional to the second activation control signal Q1. Similarly, a second activation operating circuit 551b of the second activating operation part 551 produces the fourth activation control signal Q2' which has a value substantially proportional to the second activation control signal Q2.

Further, a second activation operating circuit 551c of the second activation operating part 551 produces the fourth activation control signal Q3' which has a value substantially proportional to the second activation control signal Q3. That is, the three-phase fourth activation control signals Q1', Q2', and Q3' are three-phase current signals which responds with the three-phase second activation control signals Q1, Q2, and Q3. When necessary, the second activation operating circuits 551a, 551b, and 551c of the second activation operating part 551 can produce the fourth activation control signals Q1', Q2', and Q3' by converting the second activation control signals Q1, Q2, Q3 into pulses in response to the switching pulse signal Wp.

In FIG. 11, the three-phase third activation control signals P1', P2', and P3' are supplied to the activation control terminal sides of the three first power amplifying parts of the power supplying part 20. The FET power current-mirror circuit of the first power amplifying part of the first phase amplifies the third activation control signal P1' which is the input current to the activation control terminal. As a result, the first FET power transistor of the first power amplifying part performs high-frequency switching operation in response to the third activation control signal P1', and supplies the pulsive drive voltage signal V1 and the negative part of the drive current signal I1 to the winding 12. Similarly, the FET power current-mirror circuit of the first power amplifying part of the second phase amplifies the third activation control signal P2' which is the input current to the activation control terminal. As a result, the first FET power transistor of the first power amplifying part performs high-frequency switching operation in response to the third activation control signal P2', and supplies the drive voltage signal V2 and the negative part of the drive current signal I2 to the winding 13.

Further, the FET power current-mirror circuit of the first power amplifying part of the third phase amplifies the third activation control signal P3' which is the input current to the activation control terminal. As a result, the first FET power transistor of the first power amplifying part performs high-frequency switching operation in response to the third activation control signal P3', and supplies the drive voltage signal V3 and the negative part of the drive current signal I3 to the winding 14.

The three-phase fourth activation control signals Q1', Q2', and Q3' are supplied to the activation control terminal sides of the three second power amplifying parts of the power supplying part 20. The FET power current-mirror circuit of the second power amplifying part of the first phase amplifies the fourth activation control signal Q1' which is the input current to the activation control terminal, and supplies the positive part of the drive current signal I1 to the winding 12.

Similarly, the FET power current-mirror circuit of the second power amplifying part of the second phase amplifies the fourth activation control signal Q2' which is the input current to the activation control terminal, and supplies the positive part of the drive current signal I2 to the winding 13. Further, the FET power current-mirror circuit of the second power amplifying part of the third phase amplifies the fourth activation control signal Q3' which is the input current to the activation control terminal, and supplies the positive part of the drive current signal I3 to the winding 14.

The current detecting part 33 shown in FIG. 11 outputs a pulsed current detection signal Ad which is substantially proportional to the composed supply current Ig to the three-phase windings 12, 13, and 14 from the voltage supplying part 25. The switching pulse signal Wp of the switching control part 37 is a high-frequency switching signal which responds with the comparison result between the current detection signal Ad and the command signal Ac. The switching pulse signal Wp is a high-frequency signal whose frequency is generally in the range of 20–500 kHz. The third activation control signals P1', P2', and P3' which are pulse signals in response to the switching pulse signal Wp cause the high-frequency switching operation of the three first power amplifying parts.

As a result, the peak value of the composed supply current Ig is controlled in response to the command signal Ac. Accordingly, the amplitudes of the drive current signals I1, I2, and I3 to the three-phase windings 12, 13, and 14 are accurately controlled in response to the command signal Ac. This remarkably reduces the pulsation of the generated drive force, and hence reduces the vibration and the acoustic noise of the disk 1 and rotor 11. Here, the frequency of the switching pulse signal Wp does not need to be constant and can be changed depending on the rotational speed and the load situation.

Each of the three-phase first activation control signals P1, P2, and P3 of the activation control part 31 has a slope in at least one of the rising and falling slopes which responds with the slope signal of the signal producing part 104. Each of the three-phase third activation control signals P1', P2', and P3' responds with each of the three-phase first activation control signals P1, P2, and P3 and the switching pulse signal Wp. The three first power amplifying parts perform ON-OFF high-frequency switching in response to the three-phase third activation control signals P1', P2', and P3', respectively.

As a result, the drive current signals I1, I2, and I3 to the three-phase windings 12, 13, and 14 are altered smoothly in response to the first activation control signals P1, P2, and P3. This reduces the pulsation of the generated drive force, and hence reduces the motor vibration and the acoustic noise of the disk 1 and rotor 11.

Each of the three-phase second activation control signals Q1, Q2, and Q3 of the activation control part 31 has a slope in at least one of the rising and falling slopes which responds with the slope signal of the signal producing part 104. Each of the three-phase fourth activation control signals Q1', Q2', and Q3' responds with the three-phase second activation control signals Q1, Q2, and Q3 (and the switching pulse signal Wp when necessary).

The three second power amplifying parts perform smooth alteration to current paths (or high-frequency switching) in response to the three-phase fourth activation control signals Q1', Q2', and Q3' respectively. As a result, the drive current signals I1, I2, and I3 to the three-phase windings 12, 13, and 14 are altered smoothly in response to the three-phase first activation control signals Q1, Q2, and Q3. This reduces the pulsation of the generated drive force, and hence reduces the vibration and the acoustic noise of the disk 1 and rotor 11.

In this embodiment, as described above, the power transistors for supplying the drive currents to the windings perform ON-OFF high-frequency switching, and reduces the power loss of the power transistors. That is, the first power transistors of the first power amplifying parts perform ON-OFF high-frequency switching operation responding with the third activation control signals, and the second power transistors of the second power amplifying parts perform ON-OFF high-frequency switching operation responding with the forth activation control signals.

This remarkably reduces the power loss and the heat generation in the disk drive apparatus and the motor, and the disk drive apparatus achieves a stable recording operation and/or a stable reproducing operation of a disk in high-density.

Further, in this embodiment, the current detection signal Ad responds with the composed supply current to the three-phase windings from the voltage supplying part, and then the single switching pulse signal Wp responds with the comparison result between the current detection signal Ad and the command signal Ac. In response to the switching pulse signal Wp, at least one of the three first power amplifying parts and the three second power amplifying parts performs ON-OFF high-frequency switching.

Therefore, an accurate current control in response to the command signal is achieved, and hence a disk drive apparatus with high performance and low power consumption is realized. In particular, the current detection signal which is substantially proportional to the composed supply current to the three-phase windings from the voltage supplying part, and then the switching pulse signal is produced in response to the comparison result between the current detection signal and the command signal. Accordingly, the three-phase drive current signals I1, I2, and I3 are precisely controlled in response to the command signal. This reduces the pulsation of the generated drive force.

Further, since one or two of the first power amplifying parts perform ON-OFF high-frequency switching substantially simultaneously in response to the single switching pulse signal Wp, the configuration for high-frequency switching operation becomes simple and hence inexpensive.

The configuration of the current detecting part is not restricted to that of the embodiment which outputs the current detection signal directly proportional to the composed supply current. The current detecting part can output a current detection signal which is a smoothed signal of the composed supply current by a filter and the like. Further, in addition to the first power amplifying parts, the second power amplifying parts can perform high-frequency switching.

In this embodiment, various advantages similar to those in the-above-mentioned Embodiment 1 are obtained.

[Embodiment 3]

Figure 15:
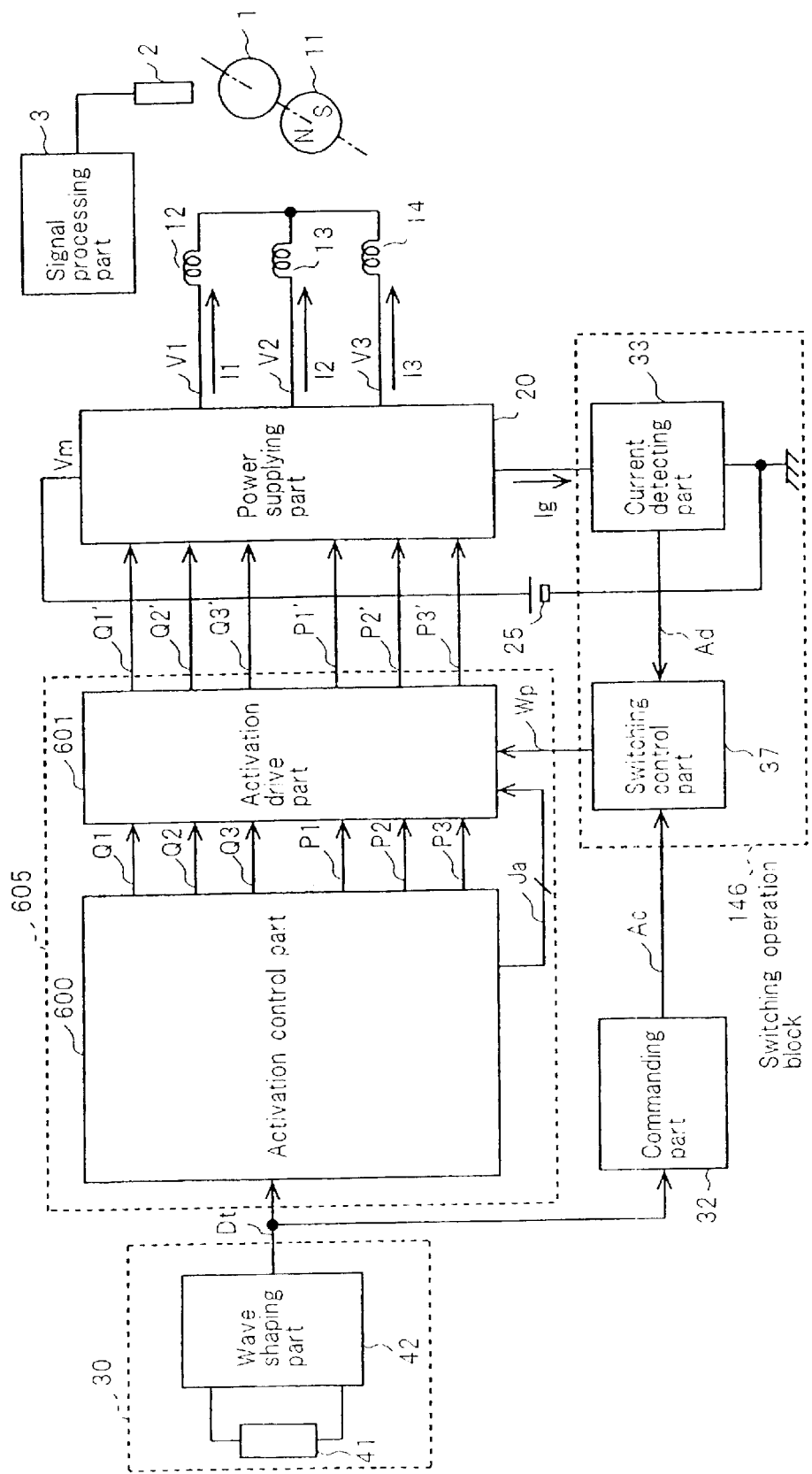
FIG. 15 shows the overall configuration in accordance with Embodiment 3 of the invention.

FIGS. 15–21 show: a disk drive apparatus comprising a motor in accordance with Embodiment 3 of the invention; and a motor which is to be used in a disk drive apparatus. FIG. 15 shows the overall configuration. In this embodiment, an activation control part 600 and an activation drive part 601 constitute an activation operation block 605. Further, digital pulse signals are used as first, second, third, and fourth activation control signals. Components similar to the foregoing Embodiments 1 and 2 are designated by the same numerals, and detailed description thereof is omitted.

Figure 16:
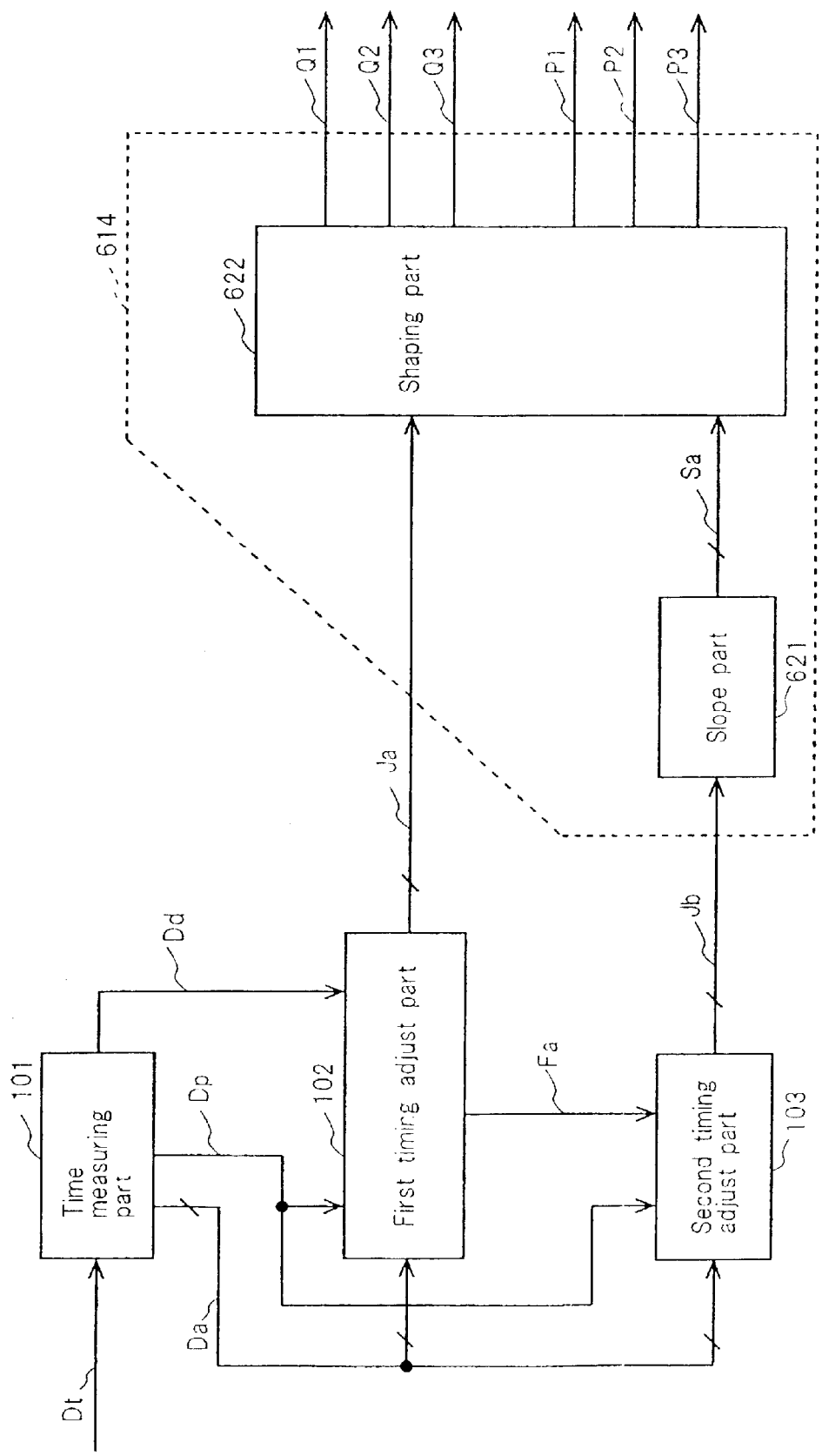
FIG. 16 shows the configuration of an activation control part 600 in accordance with Embodiment 3.

The activation control part 600 of the activation operation block 605 shown in FIG. 15 produces the three-phase first activation control signals P1, P2, and P3 and the three-phase second activation control signals Q1, Q2, and Q3 in response to the position pulse signal Dt of the position detecting part 30, and supplies them to the activation drive part 601. The activation control part 600 further supplies a first adjust signal Ja (or first state output signal Jd) to the activation drive part 601. FIG. 16 shows the detailed configuration of the activation control part 600.

The activation control part 600 shown in FIG. 16 comprises a time measuring part 101, a first timing adjust part 102, a second timing adjust part 103, and a signal producing part 614. The detailed configurations of the time measuring part 101, the first timing adjust part 102, and the second timing adjust part 103 are similar to those shown in FIG. 3.

The time measuring part 101 measures the time interval T0 of one period or half a period of the position pulse signal Dt, and outputs the measured data signal Da and the measure operation signal Dp. The time measuring part 101 further produces the delayed position pulse signal Dd which is a delayed signal of the position pulse signal Dt by a time interval Td, when necessary.

On receiving the measure operation signal Dp, the first timing adjust part 102 reads the measured data signal Da. The first timing adjust part 102 produces the first timing signal Fa in each first adjust time T1 which is substantially proportional to the time interval T0. The first timing adjust part 102 changes and shifts the state of the first state output signal Jd and the state of the first adjust signal Ja in each first adjust time T1 in response to the first timing signal Fa. Furthermore, the first timing adjust part 102 sets the first adjust signal Ja substantially to a first predetermined state in response to the measure operation signal Dp.

On receiving the measure operation signal Dp, the second timing adjust part 103 reads the measured data signal Da. The second timing adjust part 103 produces the second timing signal in each second adjust time T2 which is substantially proportional to the time interval T0. The second timing adjust part 103 changes and shifts the state of the second state output signal Je and the state of the second adjust signal Jb in each second adjust time T2. Furthermore, the second timing adjust part 103 sets the second adjust signal Jb substantially to a second predetermined state in response to at least the first timing signal Fa.

Figure 22:
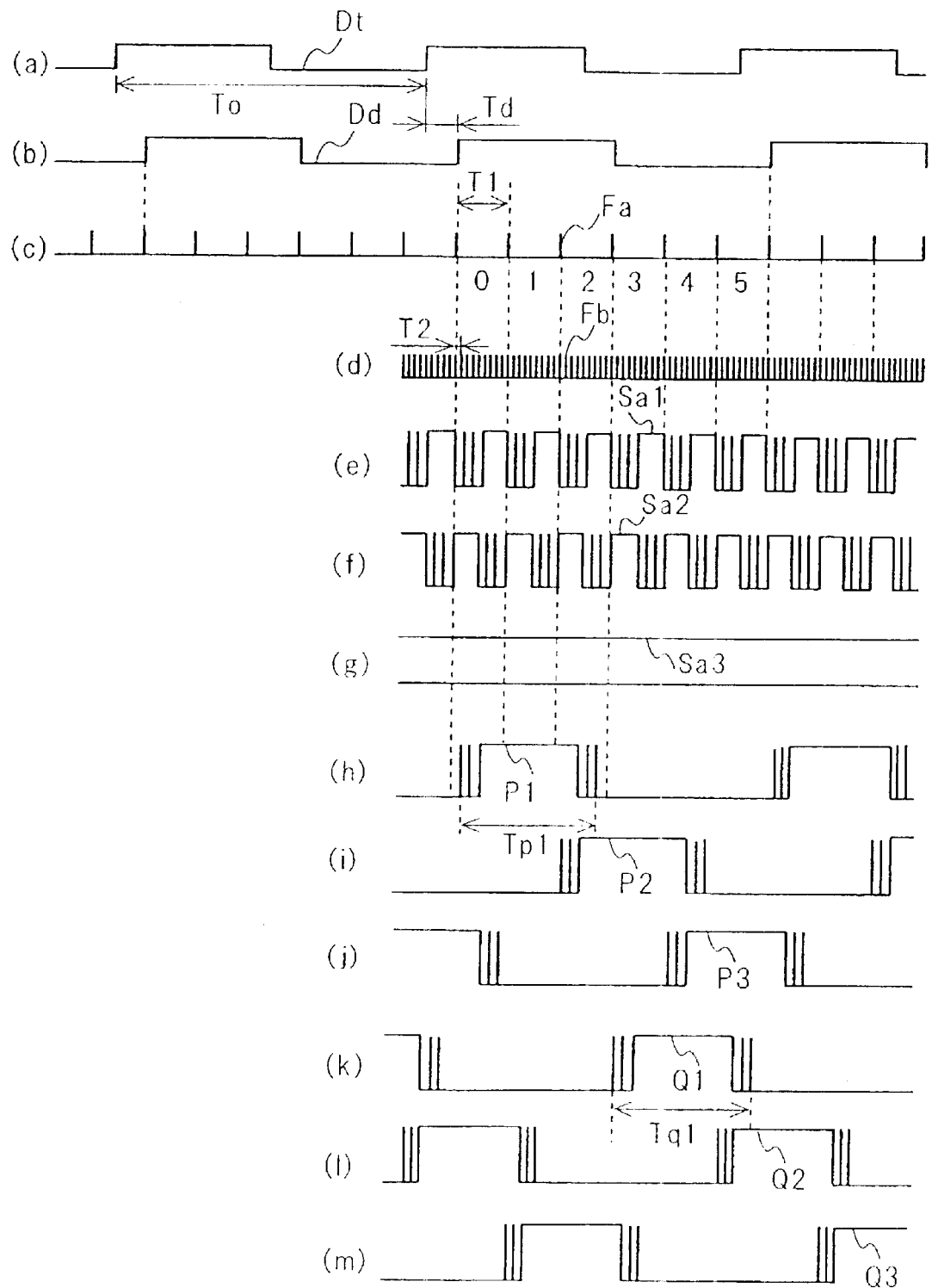
FIG. 22 shows a waveform diagram used for the description of the operation of the activation control part 600 in accordance with Embodiment 3.

FIG. 22 shows a waveform diagram for explaining the operation of the time measuring part 101, the first timing adjust part 102, and the second timing adjust part 103. Described below is the case in which the time measuring part 101 measures one period of the position pulse signal Dt. The measure part 121 of the time measuring part 101 measures the time interval T0 of one period of the position pulse signal Dt as shown in FIG. 22(a).

The delay part 122 of the time measuring part 101 produces the delayed position pulse signal Dd by delaying the whole of the position pulse signal Dt by the delay time Td. The delay time Td is substantially proportional to the measured time interval T0 (see FIG. 22(b)), and Td can be equal to zero (no delay). The delay part 122 produces the measure operation signal Dp in the timing delayed from the measurement edge of the position pulse signal Dt by the desired delay time Td.

The first cyclic count circuit 221 of the first timing adjust part 102 produces the first timing signal Fa in each first adjust time T1 which responds with the measured time interval T0 (see FIG. 22(c)). The first adjust time T1 is substantially equal to T0/6. The first state circuit 222 of the first timing adjust part 102 sets the first state output signal Jd substantially to a first predetermined state in response to the measure operation signal Dp. After that, the first state circuit 222 changes and shifts the state of the first state output signal Jd in response to the first timing signal Fa.

The first adjust circuit 223 of the first timing adjust part 102 produces the first adjust signal Ja which responds with the first state output signal Jd. As a result, the first adjust signal Ja is changed substantially in six states during one period of the delayed position pulse signal Dd. The second cyclic count circuit 231 of the second timing adjust part 103 produces the second timing signal Fb in each second adjust time T2 which responds with the measured time interval T0 (see FIG. 22(d)).

In this embodiment, the second adjust time T2 is substantially equal to T1/30 (T0/180). The second state circuit 232 of the second timing adjust part 103 sets the second state output signal Je substantially to a second predetermined state in response to the first timing signal Fa and the measure operation signal Dp. After that, the second state circuit 232 changes and shifts the state of the second state output signal Je in response to the second timing signal Fb. The second adjust circuit 233 of the second timing adjust part 103 produces the second adjust signal Jb which responds with the second state output signal Je. As a result, the second adjust signal Jb is changed substantially in 30 states during one pulse interval of the first timing signal Fa.

The signal producing part 614 shown in FIG. 16 comprises a slope part 621 and a shaping part 622. The slope part 621 produces digital slope signals Sa which have at least a digital slope in response to the second adjust signal Jb.

Figure 17:
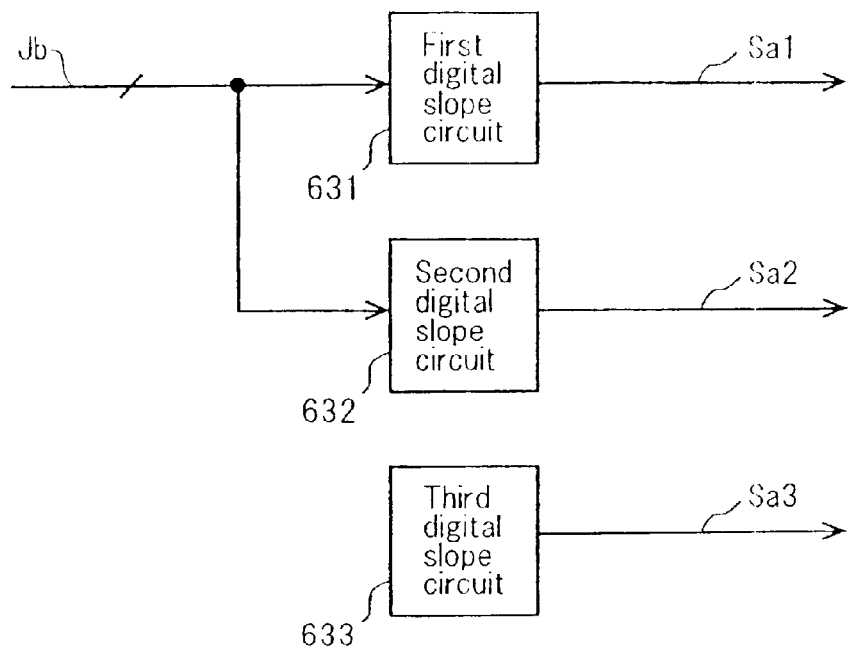
FIG. 17 shows the configuration of a slope part 621 of a signal producing part 614 in accordance with Embodiment 3.

The shaping part 622 produces the three-phase first activation control signals P1, P2, and P3 and the three-phase second activation control signals Q1, Q2, and Q3 which are digital signals in response to the first adjust signal Ja and the slope signal Sa. FIG. 17 shows the detailed configuration of the slope part 621 of the signal producing part 614.

The slope part 621 shown in FIG. 17 comprises a first digital slope circuit 631, a second digital slope circuit 632, and a third digital slope circuit 633. The first digital slope circuit 631 produces a digital first slope signal Sa1 which responds with the second adjust signal Jb of the second timing adjust part 103. FIG. 22(e) shows the waveform of the first slope signal Sa1.

The second adjust signal Jb is set to a second predetermined state in response to the first timing signal Fa, and hence the first slope signal Sa1 is set to "Lb" (low level). During the time when the second adjust signal Jb is lower than a first predetermined value, the first slope signal Sa1 is at "Lb."

The first slope signal Sa1 makes pulses in response to the second adjust signal Jb, and progressively increases pulse widths according to the increase of the second adjust signal Jb. When the second adjust signal Jb reaches a second predetermined value, the first slope signal Sa1 is set to "Hb" (high level).

As a result, the first slope signal Sa1 becomes a digital pulse signal in synchronization with the first timing signal Fa, and have pulses whose averaged value in amplitudes substantially forms a smooth rising slope.

Similarly, the second digital slope circuit 632 outputs a digital second slope signal Sa2 in response to the second adjust signal Jb of the second timing adjust part 103. FIG. 22(f) shows the waveform of the second slope signal Sa2. The second adjust signal Jb is set to a second predetermined state in response to the first timing signal Fa, and hence the second slope signal Sa2 is set to "Hb" (high level).

During the time when the second adjust signal Jb is lower than a third predetermined value (which preferably equal to the second predetermined value), the second slope signal Sa2 is at "Hb." After the second adjust signal Jb exceeds the third predetermined value, the second slope signal Sa2 makes pulses in response to the second adjust signal Jb, and progressively decreases pulse widths according to the increase of the second adjust signal Jb.

When the second adjust signal Jb reaches a forth predetermined value, the second slope signal Sa2 is set to "Lb". As a result, the second slope signal Sa2 becomes a digital pulse signal in synchronization with the first timing signal Fa, and have pulses whose averaged value in amplitudes substantially forms a smooth falling slope. The third digital slope circuit 633 outputs a digital third slope signal Sa3, which is a digital signal of "Hb" (see FIG. 22(g)).

Figure 18:
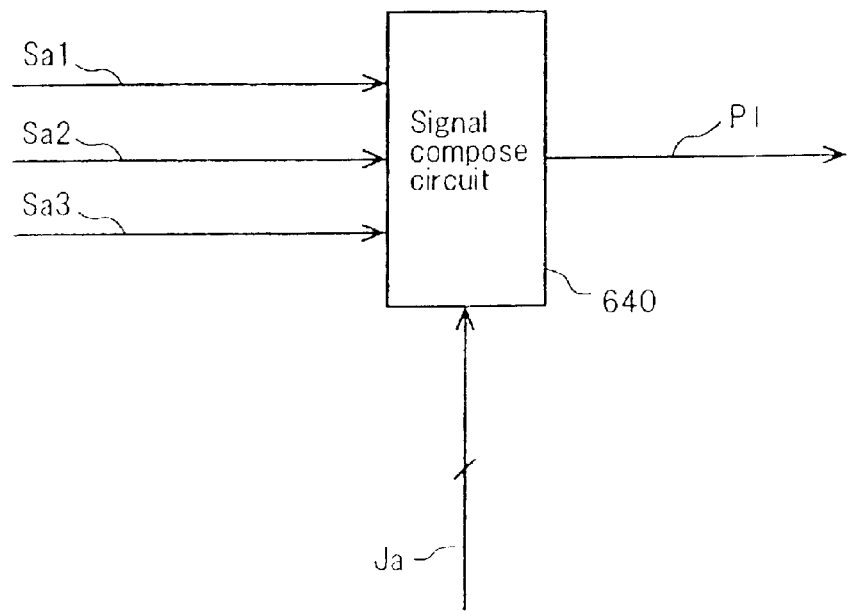
FIG. 18 shows the partial configuration of a shaping part 622 of the signal producing part 614 in accordance with Embodiment 3.

The shaping part 622 of the signal producing part 614 shown in FIG. 16 produces the three-phase first activation control signals P1, P2, and P3 and the three-phase second activation control signals Q1, Q2, and Q3 in response to the first adjust signal Ja of the first timing adjust part 102 and the second adjust signal Jb of the second timing adjust part 103. FIG. 18 shows the detailed configuration of a shaping circuit which is a part of the shaping part 622 for producing the first activation control signal P1. The shaping circuit comprises a signal compose circuit 640.

The signal compose circuit 640 combines the first slope signal Sa1, the second slope signal Sa2, and the third slope signal Sa3 of the slope part 621 in response to the first adjust signal Ja of the first timing adjust part 102 so as to compose digitally the first activation control signal P1. As a result, the first activation control signal P1 becomes a digital signal which responds with the first adjust signal Ja (first state output signal Jd) of the first timing adjust part 102 and the second adjust signal Jb (second state output signal Je) of the second timing adjust part 103.

Actually, the first activation control signal P1 is produced by selecting the slope signals Sa1, Sa2, and Sa3 in response to the first adjust signal Ja during each active period Tp1.

Each of the shaping circuits of the shaping part 622 for producing each of the first activation control signals and the second activation control signals has the same detailed configuration as that of the shaping circuit shown in FIG. 18. So detailed description of them is omitted.

FIG. 22(h) shows the waveform of the first activation control signal P1. The first activation control signal P1 is a pulse signal which responds with the first slope signal Sa1 in the rising slope portion, the third slope signal of "Hb" in the flat top portion, and the second slope signal Sa2 in the falling slope portion during the active period Tp1. The first activation control signal P1 remains "Lb" during the rest period except the active period Tp1. The active period Tp1 of the first activation control signal P1 is substantially longer than the electrical angle of 360/3=120 degrees.

FIGS. 22(i) and 22(j) show the waveforms of the other first activation control signals P2 and P3. As such, the three-phase first activation control signals P1, P2, and P3 are pulse signals which respond with the first adjust signal Ja and the second adjust signal Jb. Each of the active periods Tp1, Tp2, and Tp3 of the three-phase first activation control signals P1, P2, and P3 are substantially longer than the period of 120 electrical degrees. In this embodiment, Tp1, Tp2, and Tp3 are in the range of 150–180 degrees.

FIG. 22(k) shows the waveform of the second activation control signal Q1. The second activation control signal Q1 is a pulse signal which responds with the first slope signal Sa1 in the rising slope portion, the third slope signal of "Hb" in the flat top portion, and the second slope signal Sa2 in the falling slope portion during the active period Tq1. The second activation control signal Q1 remains "Lb" during the rest period except the active period Tq1. The active period Tq1 of the second activation control signal Q1 is substantially longer than the electrical angle of 360/3=120 degrees. FIGS. 22(l) and 22(m) show the waveforms of the other second activation control signals Q2 and Q3. As such, the three-phase first activation control signals Q1, Q2, and Q3 are pulse signals which respond with the first adjust signal Ja and the second adjust signal Jb. Each of the active periods Tq1, Tq2, and Tq3 of the three-phase second activation control signals Q1, Q2, and Q3 are substantially longer than the period of 120 electrical degrees. In this embodiment, Tq1, Tq2, and Tq3 are in the range of 150–180 degrees.

The first activation control signal P1 and the second activation control signal Q1 are in the reversed phase (phase difference of the electrical angle of 180 degrees) to each other. Similarly, the first activation control signal P2 and the second activation control signal Q2 are in the reversed phase, while the first activation control signal P3 and the second activation control signal Q3 are in the reversed phase.

Figure 19:
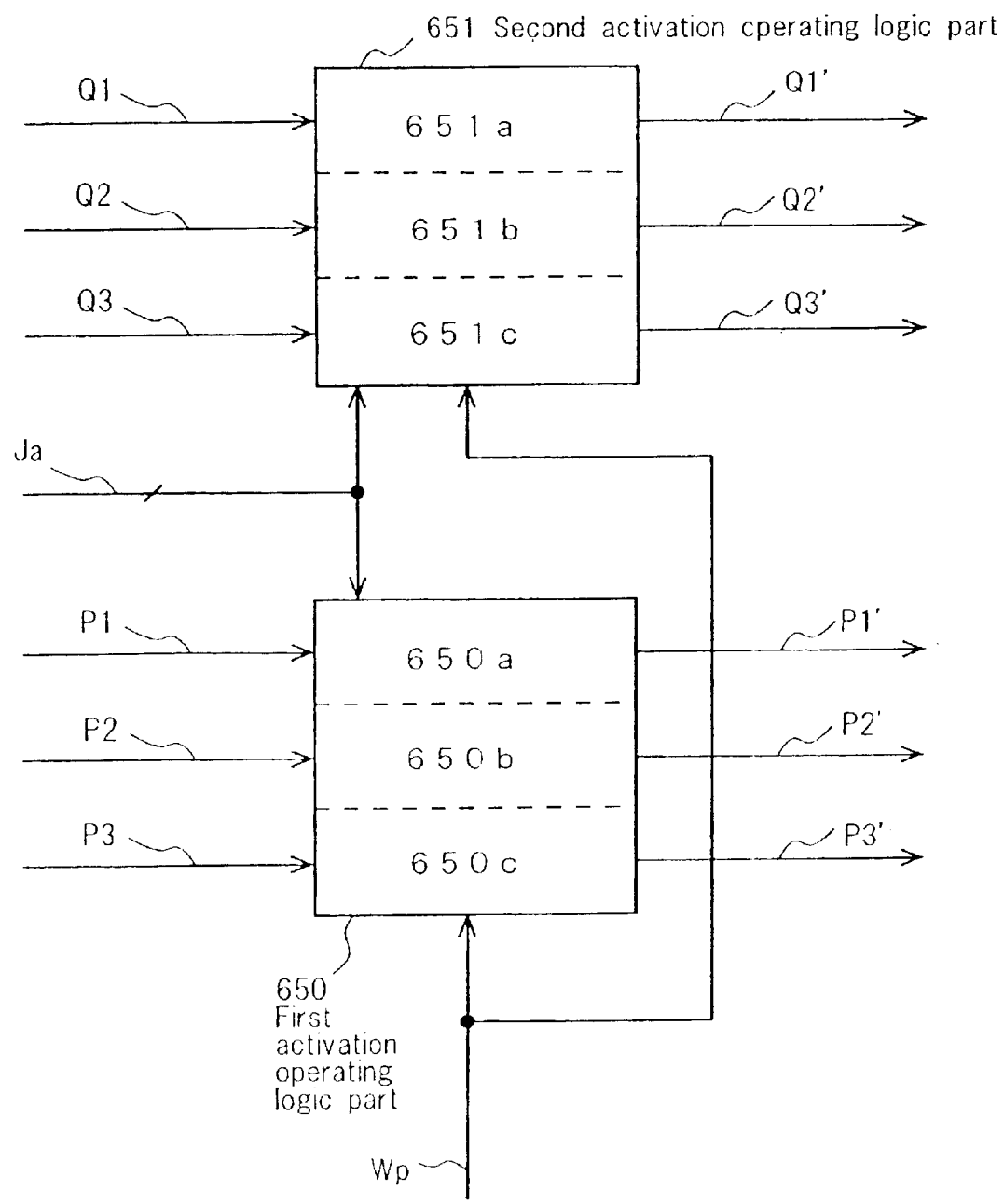
FIG. 19 shows the configuration of an activation drive part 601 in accordance with Embodiment 3.

The activation drive part 601 shown in FIG. 15 logically composes: the first activation control signals P1, P2, and P3 and/or the second activation control signals Q1, Q2, and Q3 of the activation control part 600; and the switching pulse signal Wp of the switching control part 37. The activation drive part 601 produces third activation control signals P1', P2', and P3' and fourth activation control signals Q1', Q2', and Q3'. FIG. 19 shows the detailed configuration of the activation drive part 601.

The activation drive part 601 shown in FIG. 19 comprises a first activation operating logic part 650 and a second activation operating logic part 651. A first compose logic part 650a of the first activation operating logic part 650 logically composes the first activation control signal P1 and the switching pulse signal Wp during a period of the active period Tp1 in response to the first adjust signal Ja, and produces the third activation control signal P1'. Similarly, a first compose logic part 650b of the first activation operating logic part 650 logically composes the first activation control signal P2 and the switching pulse signal Wp during a period of the active period Tp2 in response to the first adjust signal Ja, and produces the third activation control signal P2'.

Further, a first compose logic part 650c of the first activation operating logic part 650 logically composes the first activation control signal P3 and the switching pulse signal Wp during a period of the active period Tp3 in response to the first adjust signal Ja, and produces the third activation control signal P3'.

A second compose logic part 651a of the second activation operating logic part 651 logically composes the second activation control signal Q1 and the switching pulse signal Wp during a period of the active period Tq1 in response to the first adjust signal Ja, and produces the fourth activation control signal Q1'. Similarly, a second compose logic part 651b of the second activation operating logic part 651 logically composes the second activation control signal Q2 and the switching pulse signal Wp during a period of the active period Tq2 in response to the first adjust signal Ja, and produces the fourth activation control signal Q2'.

Further, a second compose logic part 651c of the second activation operating logic part 651 logically composes the second activation control signal Q3 and the switching pulse signal Wp during a period of the active period Tq3 in response to the first adjust signal Ja, and produces the fourth activation control signal Q3'.

Besides, each of the third activation control signals P1', P2', and P3' can be produced by producting logically the first activation control signals P1, P2, and P3 and the switching pulse signal Wp, in another configuration of the activation drive part. Further, the fourth activation control signals Q1', Q2', and Q3' can be produced by outputting directly the three-phase second activation control signals Q1, Q2, and Q3, in another configuration of the activation drive part.

The three-phase third activation control signals P1', P2', and P3' and the three-phase fourth activation control signals Q1', Q2', and Q3' of the activation drive part 601 shown in FIG. 15 are provided to the power supplying part 20. The power supplying part 20 comprises the three first power amplifying parts and the three second power amplifying parts (see FIG. 6), and alters current paths to the three-phase windings 12, 13, and 14 in response to the rotation of the disk 1 and the rotor 11.

Figure 20:
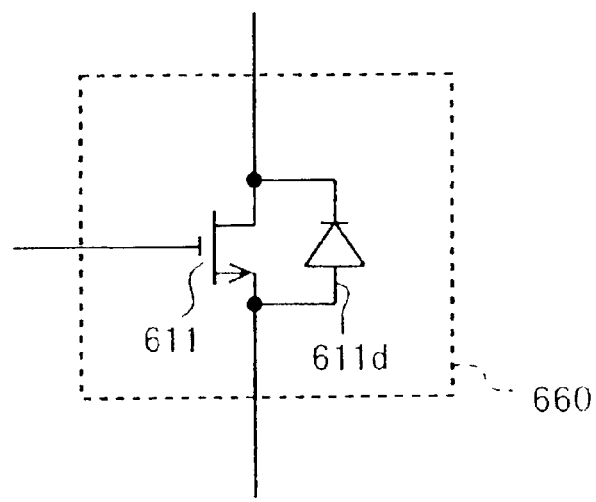
FIG. 20 shows the circuit of a first power amplifying part 660 in accordance with Embodiment 3.

The first power amplifying part shown in FIG. 12 can be used in this embodiment. Another preferable configuration of the first power amplifying part is shown in FIG. 20. The first power amplifying part 660 shown in FIG. 20 comprises a first power transistor 661 and a first power diode 661d. The first power transistor 661 is an N-channel MOS-type FET power transistor (an NMOS-FET power transistor). The first power diode 661d is a parasitic diode which is connected in the reverse direction from the current flow-out terminal side to the current flow-in terminal side of the power transistor.

Figure 21:
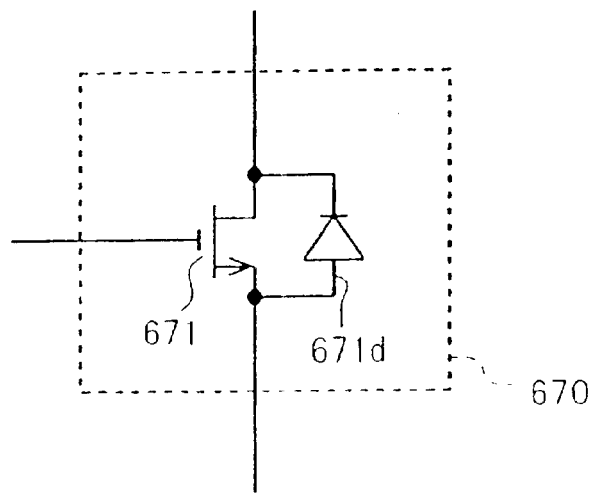
FIG. 21 shows the circuit of a second power amplifying part 670 in accordance with Embodiment 3.

Similarly, the second power amplifying part shown in FIG. 13 can be used in this embodiment. Another preferable configuration of the second power amplifying part is shown in FIG. 21. The second power amplifying part 670 shown in FIG. 21 comprises a second power transistor 671 and a second power diode 671d. The second power transistor 671 is an N-channel MOS-type FET power transistor (an NMOS-FET power transistor). The second power diode 671d is a parasitic diode which is connected in the reverse direction from the current flow-out terminal side to the current flow-in terminal side of the power transistor.

The three first power amplifying parts of the power supplying part 20 perform high-frequency switching operation in response to the third activation control signals P1', P2', and P3'. The three second power amplifying parts of the power supplying part 20 perform high-frequency switching operation in response to the fourth activation control signals Q1', Q2', and Q3'.

The current detecting part 33 shown in FIG. 15 detects the conducted current or the composed supply current Ig which is supplied to the three-phase windings 12, 13, and 14 from the voltage supplying part 25 through the three first power amplifying parts of the power supplying part 20. The current detecting part 33 outputs a pulsed current detection signal Ad which responds with the composed supply current Ig. The switching pulse signal Wp of the switching control part 37 is a high-frequency switching signal which responds with the comparison result between the current detection signal Ad and the command signal Ac. The switching pulse signal Wp is a high-frequency signal whose frequency is generally in the range of 20–500 kHz. As a result, the composed supply current Ig is controlled in response to the command signal Ac. Accordingly, the drive current signals I1, I2, and I3 to the three-phase windings 12, 13, and 14 are accurately controlled in response to the command signal Ac. This reduces the pulsation of the generated drive force, and hence reduces the vibration and the acoustic noise of the disk 1 and rotor 11.

Each of the three-phase first activation control signals P1, P2, and P3 of the activation control part 31 substantially has at least a smooth slope in at least one of the rising and falling slopes which responds with the slope signals of the signal producing part 614. Since the three-phase third activation control signals P1', P2', and P3' responds with the three-phase first activation control signals P1, P2, and P3, each of the third activation control signals P1', P2', and P3' substantially has at least a smooth slope in at least one of the rising and falling slopes.

Further, each of the three-phase second activation control signals Q1, Q2, and Q3 of the activation control part 31 substantially has at least a smooth slope in at least one of the rising and falling slopes which responds with the slope signals of the signal producing part 614. Since the three-phase forth activation control signals Q1', Q2', and Q3' responds with the three-phase second activation control signals Q1, Q2, and Q3, each of the forth activation control signals Q1', Q2', and q3' substantially has at least a smooth slope in at least one of the rising and falling slopes.

The three first power amplifying parts perform high-frequency switching operation in response to the three-phase third activation control signals P1', P2', and P3', and the three second power amplifying parts perform high-frequency switching operation in response to the three-phase fourth activation control signals Q1', Q2', and Q3'. As a result, the drive current signals I1, I2, and I3 to the three-phase windings 12, 13, and 14 vary smoothly according to the first activation control signals P1, P2, and P3 and the second activation control signals Q1, Q2, and Q3. This remarkably reduces the pulsation of the generated drive force, and hence reduces the vibration and acoustic noise of the disk 1 and rotor 11.

In this embodiment, as described above, the power transistors for supplying the drive current signals to the windings perform ON-OFF high-frequency switching operation. So power losses of the power transistors are remarkably reduced. That is, the first power transistors of the first power amplifying parts and/or the second power transistors of the second power amplifying parts perform ON-OFF high-frequency switching operation. This reduces power consumption and heat generation in the disk drive apparatus and the motor. Therefore, the disk drive apparatus can achieve a stable recording operation and/or a stable reproducing operation of a disk.

Further, the three-phase first, second, third, and fourth activation control signals are digital signals, each of which has substantially at least a slope in at least one of the rising and falling slopes in response to at least a digital slope signal. As a result, the current paths to the three-phase windings 12, 13, and 14 are altered smoothly according to the rotation of the disk and the rotor. This reduces the pulsation of the generated drive force, and hence reduces the vibration and the acoustic noise of the disk 1 and rotor 11.

Further, the current detection signal Ad of the current detecting part 33 and the command signal Ac of the commanding part 32 are compared with each other, and a switching pulse signal Wp is produced in response to the comparison result. Then, the first power amplifying parts and/or the second power amplifying parts perform high-frequency switching operation in response to the switching pulse signal Wp. As a result, the amplitudes of the drive current signals I1, I2, and I3 to the three-phase windings 12, 13, and 14 are accurately controlled in response to the command signal Ac. This reduces the pulsation of the generated drive force, and an excellent disk drive apparatus with reduced vibration and reduced acoustic noise of the disk is realized.

In this embodiment, various advantages similar to those in the above-mentioned Embodiments 1 and 2 are obtained.

In Embodiment 3, the slope signals Sa1 and Sa2 can be simple pulse signals, and this case is included within the scope of the invention. For example, when the second adjust signal is lower than a first predetermined value, the first slope signal Sa1 is "Lb". Then after the second adjust signal exceeds the first predetermined value, the first slope signal Sa1 becomes "Hb."

Further, when the second adjust signal is lower than a second predetermined value, the second slope signal Sa2 is "Hb". Then after the second adjust signal exceeds the second predetermined value, the second slope signal Sa2 becomes "Lb." Here, (the first predetermined value)<(the second predetermined value). Accordingly, the period of "Hb" of the first slope signal Sa1 is longer than the period of "Lb", and the period of "Hb" of the second slope signal Sa2 is longer than the period of "Lb." The first and second activation control signals are generated by composing the slope signals Sa1, Sa2, and Sa3 in response to the first adjust signal. Accordingly, the period of "Hb" (active period) of each activation control signal is substantially longer than the electrical angle of 120 degrees.

Figure 23:
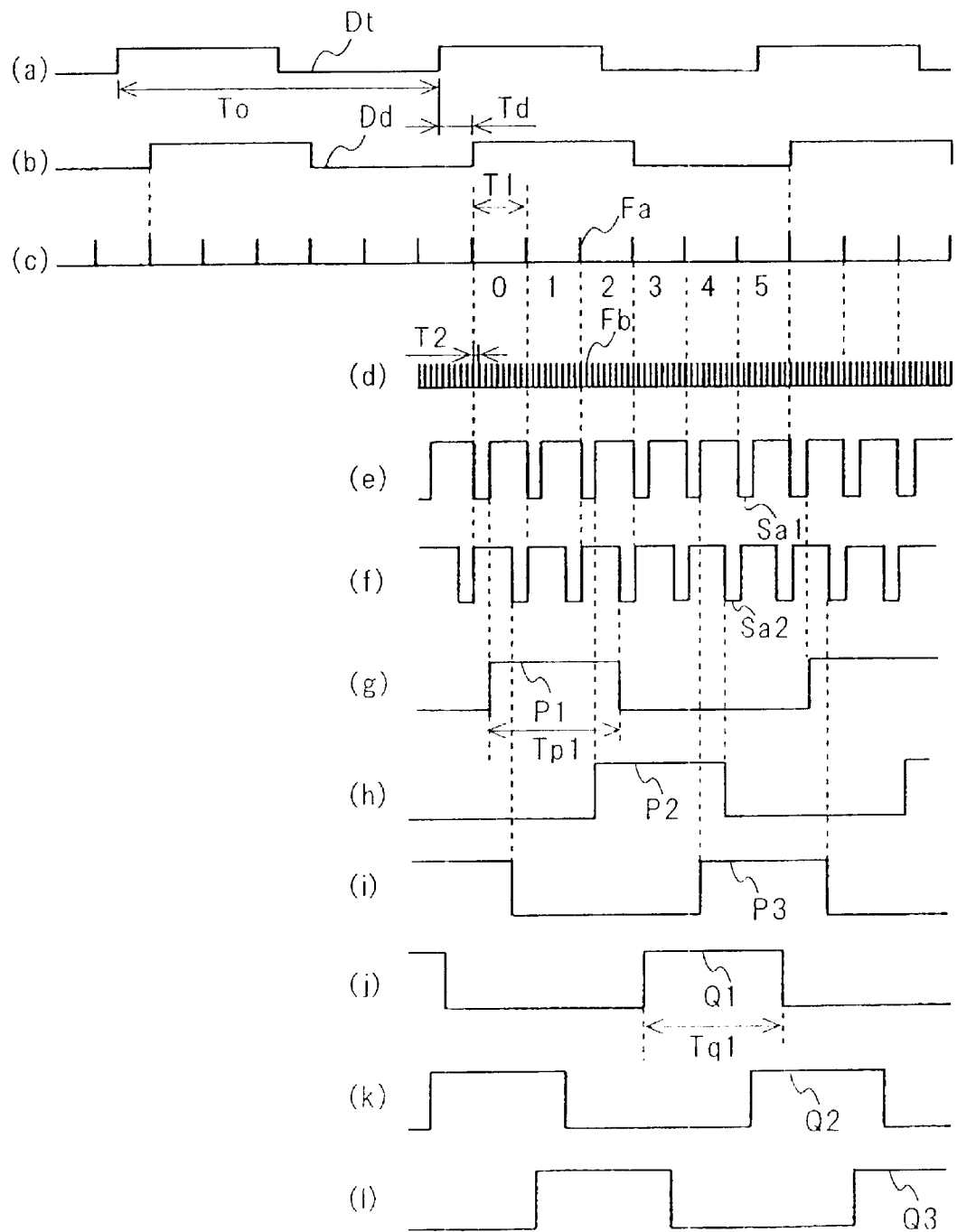
FIG. 23 shows another waveform diagram used for the description of the operation in accordance with Embodiment 3.

As a result, the active period of each of the third and fourth activation control signals is also substantially longer than the electrical angle of 120 degrees. Therefore, the current paths to the three-phase windings ate altered smoothly. Since each of the active periods of the first and second activation control signals is longer than the period of 120 degrees, each of the active periods of the third and fourth activation control signals is also longer than the period of 120 degrees. Accordingly, the current paths to the three-phase windings are altered smoothly, and hence the vibration and the acoustic noise of the disk are reduced. Further, these activation control signals are accurately produced in response to the single position pulse signal. FIG. 23 shows the relation between the slope signals Sa1, Sa2, and Sa3 and the first and second activation control signals P1, P2, P3, Q1, Q2, and Q3 in this case.

[Embodiment 4]

Figure 24:
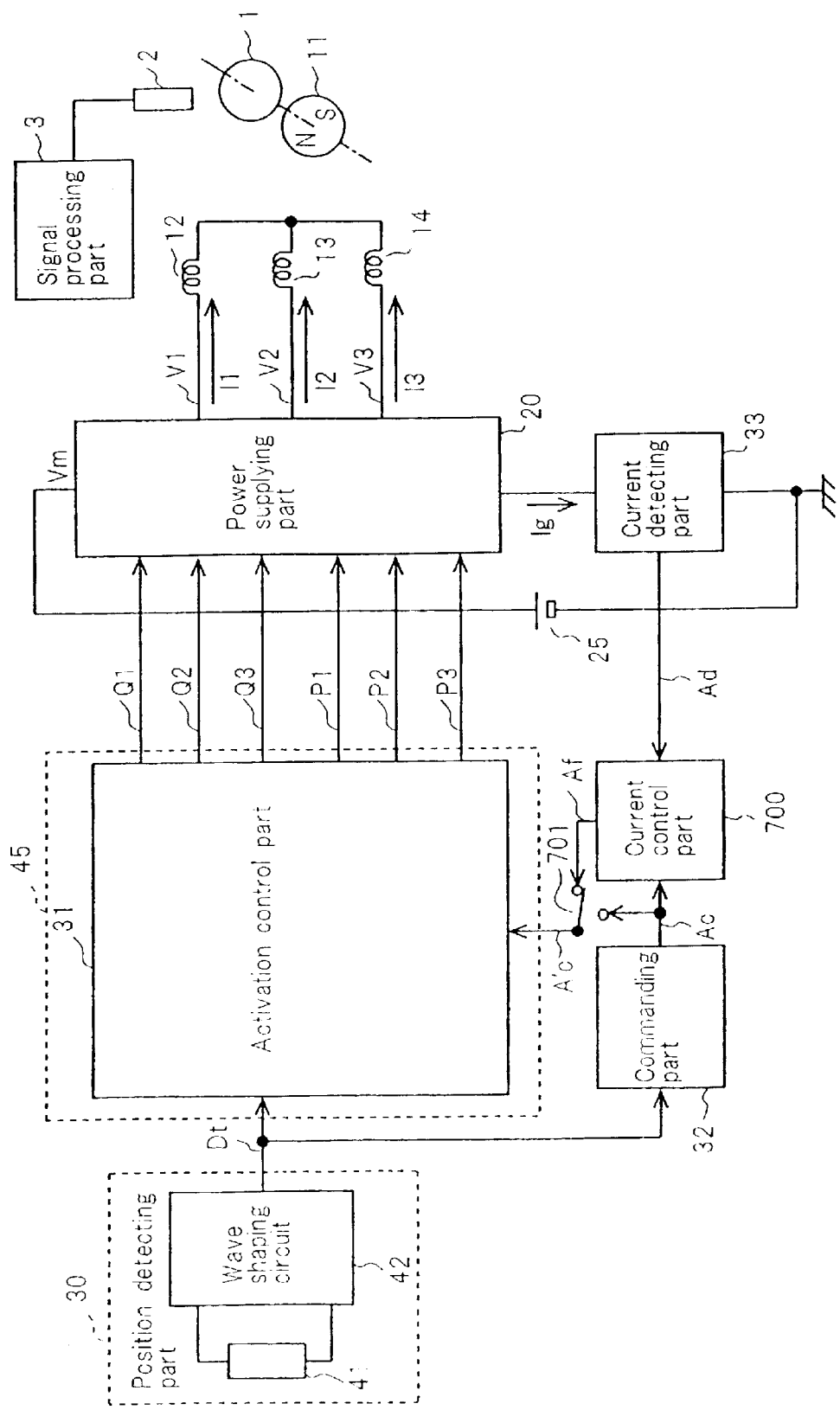
FIG. 24 shows the overall configuration in accordance with Embodiment 4 of the invention.

FIG. 24 shows: a disk drive apparatus comprising a motor in accordance with Embodiment 4 of the invention; and a motor which is suitable to be used in a disk drive apparatus. FIG. 24 shows the overall configuration. In this embodiment, a current detecting part 33 and a current control part 700 are added to the configuration in accordance with Embodiment 1. Components similar to the foregoing Embodiments 1 are designated by the same numerals, and detailed description is omitted.

The current detecting part 33 shown in FIG. 24 detects the conducted current or the composed supply current Ig to the three-phase windings 12, 13, and 14 from the voltage supplying part 25 through the three first power amplifying parts of the power supplying part 20, and outputs a current detection signal Ad. The current control part 700 compares in an analogue manner the current detection signal Ad of the current detecting part 33 with the command signal Ac of the commanding part 32, and outputs a current control signal Af responding with the comparison result.

The activation control part 31 of the activation control block 45 produces three-phase first activation control signals P1, P2, and P3 and three-phase second activation control signals Q1, Q2, and Q3 in response to the position pulse signal Dt of the position detecting part 30. The detailed configuration of the activation control part 31 is similar to that shown in FIG. 2. A switch part 701 selects either the command signal Ac of the commanding part 32 or the current control signal Af of the current control part 700, as the input signal Ac' to the current control part 31.

When the switch part 701 selects the command signal Ac of the commanding part 32, the configuration is similar to that of the above-mentioned Embodiment 1, and hence detailed description is omitted.

When the switch part 701 selects the current control signal Af of the current control part 700, the amplitudes of the first activation control signals P1, P2, and P3 and the second activation control signals Q1, Q2, and Q3 change in response to the current control signal Af. As a result, a current control loop is formed by the current detecting part 33, the current control part 700, and the power supplying part 20, and the composed supply current Ig to the three-phase windings 12, 13, and 14 is accurately controlled in response to the command signal Ac. Further, the three-phase first activation control signals P1, P2, and P3 and the three-phase second activation control signals Q1, Q2, and Q3 are smooth current signals, each of which has a smooth slope in response to the slope signal.

This reduces the pulsation of the generated drive force, and an excellent disk drive apparatus with reduced vibration and reduced acoustic noise of the disk is realized.

In this embodiment, various advantages similar to those in the above-mentioned Embodiment 1 are obtained.

[Embodiment 5]

Figure 26:
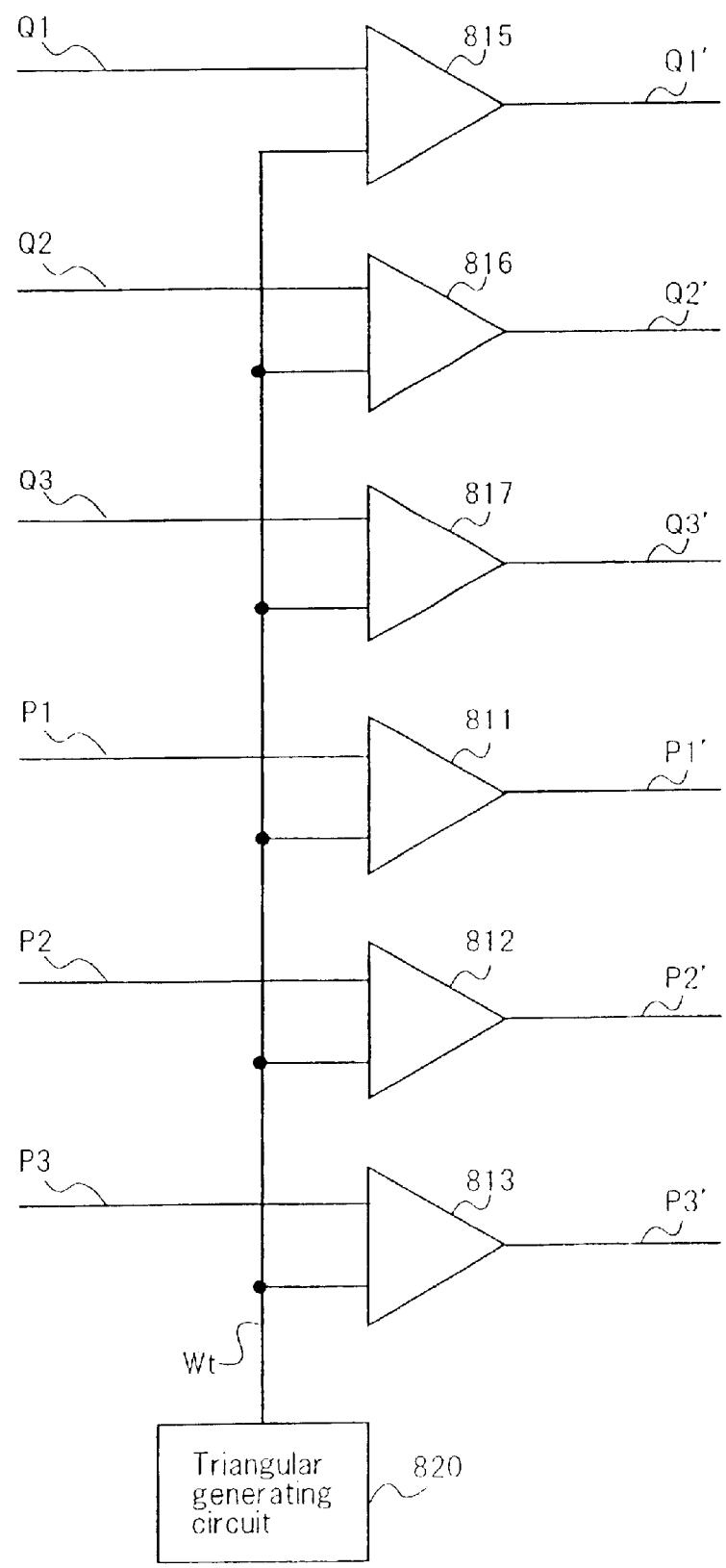
FIG. 26 shows a configuration of an activation drive part 801 in accordance with Embodiment 5.
Figure 27:
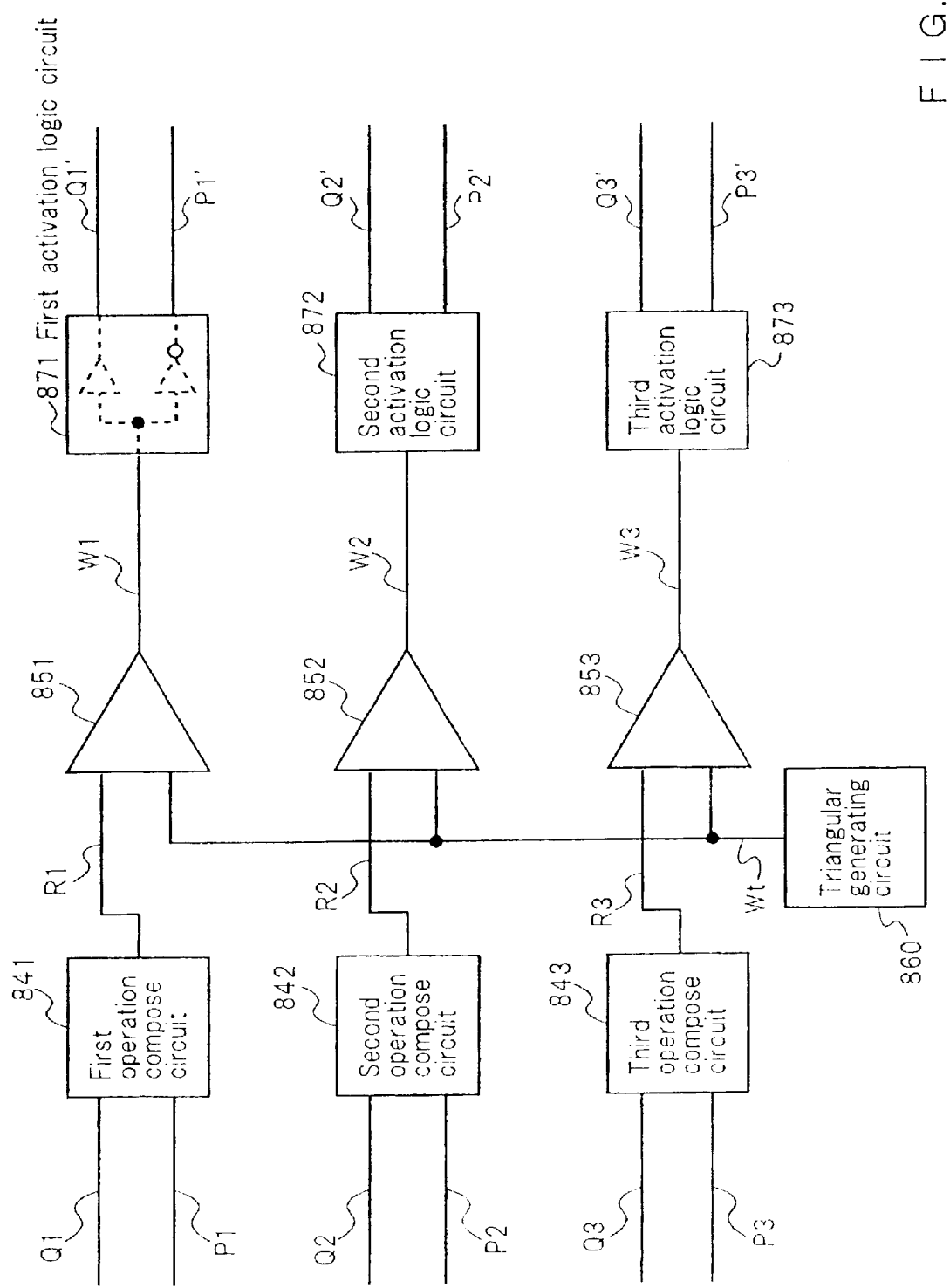
FIG. 27 shows another configuration of the activation drive part 801 in accordance with Embodiment 5.

FIGS. 25–27 show: a disk drive apparatus comprising a motor in accordance with Embodiment 5 of the invention; and a motor which is suitable to be used in a disk drive apparatus. FIG. 25 shows the overall configuration. In this embodiment, an activation drive part 801 added to the configuration in accordance with Embodiment 4. Components similar to those of Embodiments 1, 2, 3, and 4 are designated by the same numerals, and detailed description is omitted.

An activation control block 805 shown in FIG. 25 comprises an activation control part 31 and an activation drive part 801. The activation control part 31 produces three-phase first activation control signals P1, P2, and P3 and three-phase second activation control signals Q1, Q2, and Q3 which responds with the position pulse signal Dt of the position detecting part 30. The detailed configuration of the activation control part 31 is similar to that shown in FIG. 2. The switch part 701 selects either the command signal Ac of the commanding part 32 or the current control signal Af of the current control part 700, as the input signal Ac' to the current control part 31.

The activation drive part 801 produces third activation control signals P1', P2', and P3' and fourth activation control signals Q1', Q2', and Q3' in response to the first activation control signals P1, P2, and P3 and the second activation control signals Q1, Q2, and Q3 of the activation control part 31. FIG. 26 shows the detailed configuration of the activation drive part 801.

The activation drive part 801 shown in FIG. 26 comprises six comparator circuits 811, 812, 813, 815, 816, and 817 and a triangular generating circuit 820. The triangular generating circuit 820 outputs a triangular signal Wt with a predetermined frequency ft. The frequency of the triangular signal Wt is in the range of 10–500 kHz. The triangular signal Wt can be a saw-tooth signal. The comparator circuit 811 compares the first activation control signal P1 with the triangular signal Wt, and produces a third activation control signal P1' in response to the comparison result. Thus, the third activation control signal P1' becomes a PWM (pulse width modulation) pulse signal which has a pulse width responding with the first activation control signal P1. The pulse frequency of the third activation control signal P1' equals to that of the triangular signal Wt.

When the first activation control signal P1 is at zero or the lowest level, the third activation control signal P1' is at "L." Similarly, the comparator circuit 812 produces a third activation control signal P2' in response to the first activation control signal P2, and the comparator circuit 813 produces a third activation control signal P3' in response to the first activation control signal P3. Further, the comparator circuit 815 produces a fourth activation control signal Q1' in response to the second activation control signal Q1, the comparator circuit 816 produces a fourth activation control signal Q2' in response to the second activation control signal Q2, and further the comparator circuit 817 produces a fourth activation control signal Q3' in response to the second activation control signal Q3.

As a result, the three-phase third activation control signals P1', P2', and P3' are three-phase PWM signals which responds with the three-phase first activation control signals P1, P2, and P3. The three-phase fourth activation control signals Q1', Q2', and Q3' are three-phase PWM signals which responds with the three-phase second activation control signals Q1, Q2, and Q3. For example, the third activation control signal P1' has a pulse width in response to the first activation control signal P1 during the active period Tp1, and becomes at "L" in the rest period except the active period Tq1.

The three-phase third activation control signals P1', P2', and P3' of the activation drive part 801 control the three first power amplifying parts 351, 352, and 353 of the power supplying part 20. Each of the first power amplifying part 351, 352, and 353 comprises an N-channel MOS-type FET power transistor 661 and a power diode 661d as shown in FIG. 20. Accordingly, when the third activation control signal P1' is at "H," the power transistor of the first power amplifying part 651 is ON. And when the third activation control signal P1' is at "L," the power transistor of the first power amplifying part 651 is OFF.

The three-phase fourth activation control signals Q1', Q2', and Q3' of the activation drive part 801 control the three second power amplifying parts 355, 356, and 357 of the power supplying part 20. Each of the second power amplifying part 355, 356, and 357 comprises an N-channel MOS-type FET power transistor 671 and a power diode 671d as shown in FIG. 21. Accordingly, when the fourth activation control signal Q1' is at "H," the power transistor of the second power amplifying part 355 is ON. And when the fourth activation control signal Q1' is at "L," the power transistor of the second power amplifying part 355 is OFF.

Accordingly, in response to the three-phase third activation control signals P1', P2', and P3' and the three-phase fourth activation control signals Q1', Q2', and Q3', the three first power amplifying parts 351, 352, and 353 and the three second power amplifying parts 355, 356, and 357 of, the power supplying part 20 perform ON-OFF high-frequency switching, and supplies pulsive three-phase drive voltage signals V1, V2, and V3 to the three-phase windings 12, 13, and 14.

The current detecting part 33 is composed of a resistor, for example, and detects the conducted current or the composed supply current Ig to the windings 12, 13, and 14 from the voltage supplying part 25. The current detecting part 33 outputs a current detection signal Ad which is substantially proportional to the composed supply current Ig. Since the power transistors of the power supplying part 20 perform ON-OFF high-frequency switching, the composed supply current Ig and the current detection signal Ad are pulse signals.

The current control part 700 compares the current detection signal Ad with the command signal Ac, and outputs a current control signal Af in response to the comparison result. The current control part 700 includes a filter which produces a smoothed current detection signal by smoothing the pulsive current detection signal Ad. The current control signal Af is produced in response to the comparison result between the smoothed current detection signal and the command signal Ac.

When the switch part 701 selects the current control signal Af of the current control part 700, the amplitudes of the first activation control signals P1, P2, and P3 and the second activation control signals Q1, Q2, and Q3 changes in response to the current control signal Af. Therefore, a current control loop is formed by the current detecting part 33, the current control part 700, the activation control part 31, the activation drive part 801, and the power supplying part 20. The current control loop controls the average value of the composed supply current Ig to the three-phase windings 12, 13, and 14 in response to the command signal Ac.

Further, the three-phase first activation control signals P1, P2, and P3 and the three-phase second activation control signals Q1, Q2, and Q3 are smooth current signals in response to the slope signals. This reduces the pulsation of the generated drive force, and an excellent disk drive apparatus with reduced vibration and reduced acoustic noise of the disk is realized.

In this embodiment, various advantages similar to those in the above-mentioned Embodiments 1, 2, 3, and 4 are obtained.

In this embodiment, the three first power amplifying parts and the three second power amplifying parts of the power supplying part 20 perform high-frequency switching operation in response to the three-phase third activation control signals and the three-phase fourth activation control signals of the activation drive part 801 of the activation control block 805.

This reduces the power loss in the power transistors of the power supplying part 20. So a disk drive apparatus and a motor with a simple position sensor are realized, which have excellent characteristics of low power consumption, reduced vibration, reduced acoustic noise, and high reliability.

Figure 28:
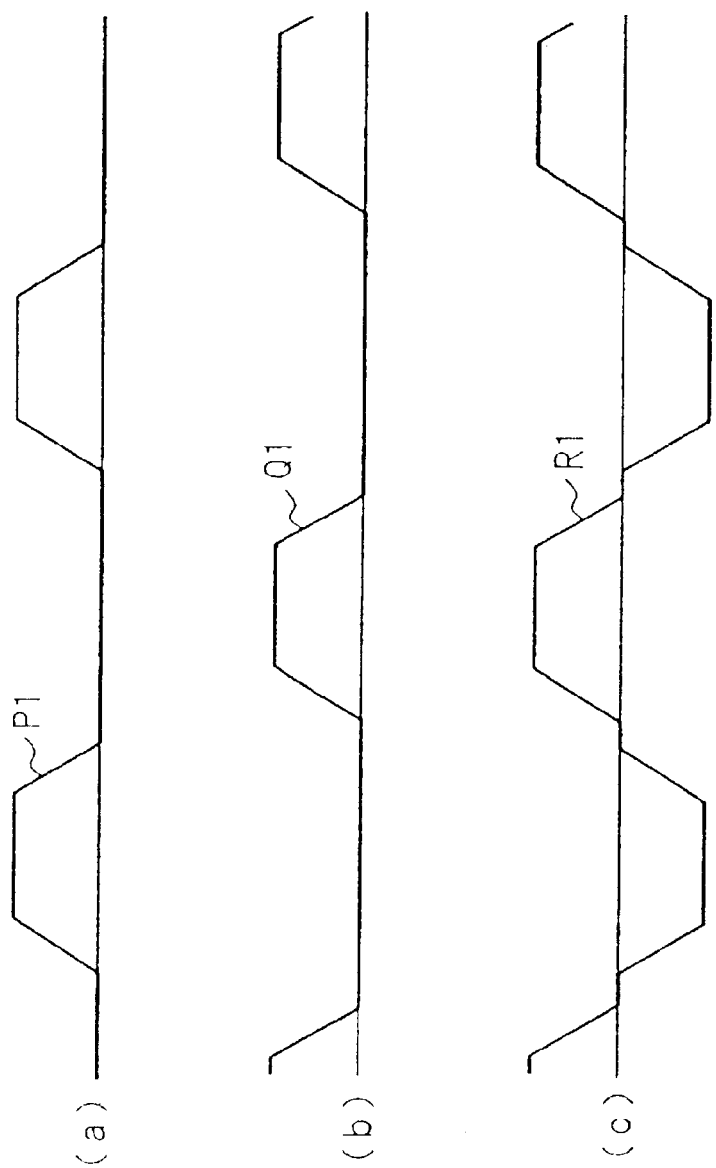
FIG. 28 shows a waveform diagram used for the description of the operation of the activation drive part 801 in accordance with Embodiment 5.
Figure 29:
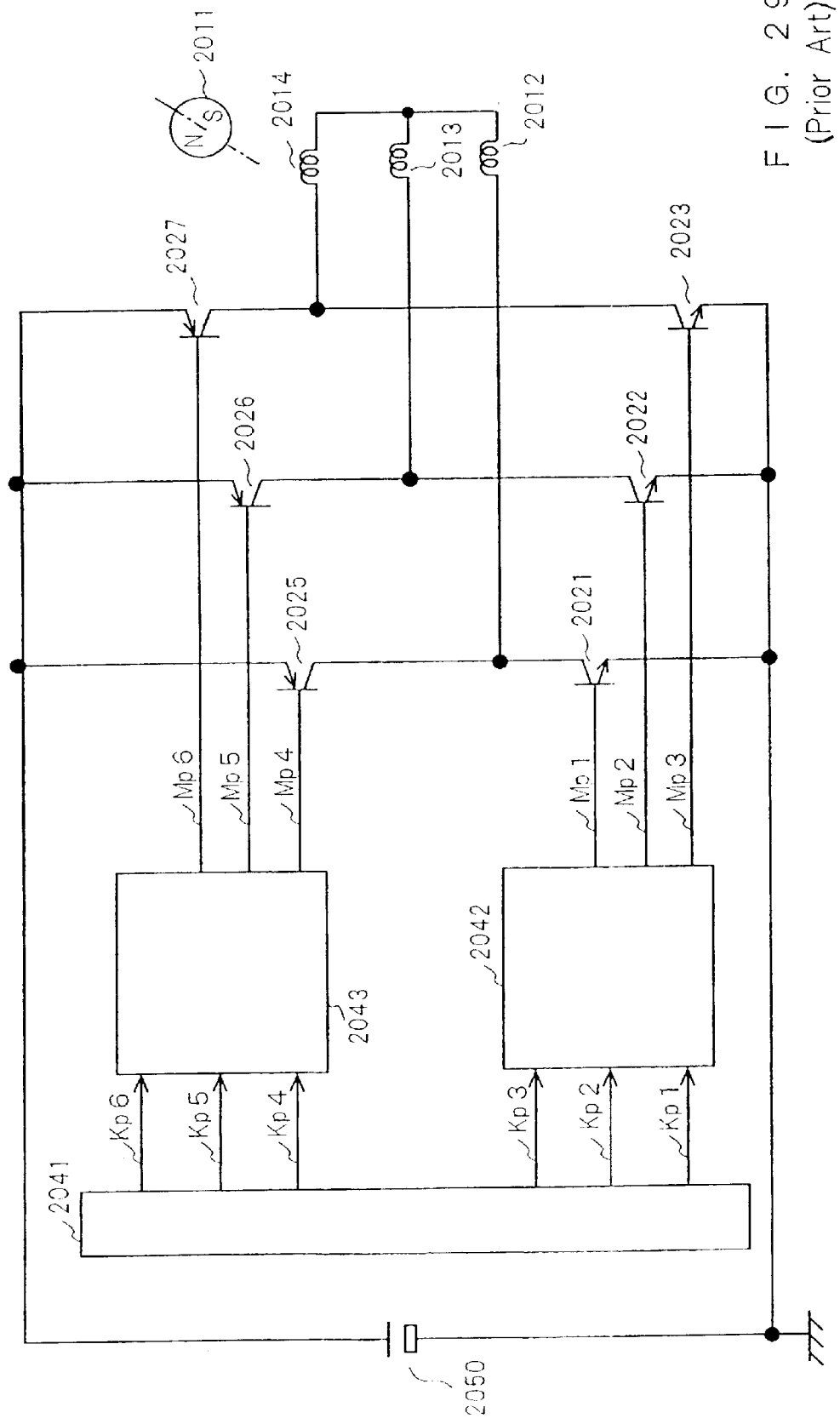
FIG. 29 shows the configuration of a motor used in a prior art disk drive apparatus.

The configuration of the activation drive part 801 is not restricted to that shown in FIG. 26. Various modifications are possible. FIG. 27 shows another detailed configuration of the activation drive part 801. An operation compose circuit 841 composes the first activation control signal P1 and the second activation control signal Q1, and produces a composite signal R1. FIGS. 28(a)–28(c) show the relation of the waveforms of the first activation control signal P1, the second activation control signal Q1, and the composite signal R1.

An operation compose circuit 842 composes the first activation control signal P2 and the second activation control signal Q2, and produces a composite signal R2. An operation compose circuit 843 composes the first activation control signal P3 and the second activation control signal Q3, and produces a composite signal R3. A triangular generating circuit 860 outputs a triangular signal Wt with a predetermined frequency ft. The frequency ft of the triangular signal Wt is in the range of 10–500 kHz. The triangular signal Wt can be a saw-tooth signal. A comparator circuit 851 compares the composite signal R1 with the triangular signal Wt, and outputs a compared pulse signal W1. The compared pulse signal W1 is a PWM signal which has a pulse width responding with the composite signal R1. A comparator circuit 852 compares the composite signal R2 with the triangular signal Wt, and outputs a compared pulse signal W2.

A comparator circuit 853 compares the composite signal R3 with the triangular signal Wt, and outputs a compared pulse signal W3. An activation logic circuit 871 produces: a third activation control signal P1' by inverting the compared pulse signal W1; and a fourth activation control signal Q1' by non-inverting the compared pulse signal W1. That is, the third activation control signal P1' and the fourth activation control signal Q1' are in the inverse relation with each other.

An activation logic circuit 872 produces: a third activation control signal P2' by inverting the compared pulse signal W2; and a fourth activation control signal Q2' by non-inverting the compared pulse signal W2. An activation logic circuit 873 produces: a third activation control signal P3' by inverting the compared pulse signal W3; and a fourth activation control signal Q3' by non-inverting the compared pulse signal W3.

As a result, the three-phase third activation control signals P1', P2', and P3' are three-phase PWM signals which responds with the three-phase composite signals R1, R2, and R3. The three-phase fourth activation control signals Q1', Q2', and Q3' are three-phase PWM signals which responds with the three-phase composite signals R1, R2, and R3.

The three first power amplifying parts 351, 352, and 353 of the power supplying part 20 perform high-frequency switching in response to the three-phase third activation control signals P1', P2', and P3'.

The three second power amplifying parts 355, 356, and 357 of the power supplying part 20 perform high-frequency switching in response to the three-phase fourth activation control signals Q1', Q2', and Q3'. Each of the first power amplifying parts and the second power amplifying parts comprises an N-channel MOS-type FET power transistor and a power diode as shown in FIG. 20 or 21. Accordingly, the power transistor of the first power amplifying part 351 performs ON-OFF high-frequency switching in response to the third activation control signal P1', the power transistor of the second power amplifying part 355 performs complementary OFF-ON high-frequency switching in response to the fourth activation control signal Q1'.

The power transistor of the first power amplifying part 352 performs ON-OFF high-frequency switching in response to the third activation control signal P2', and the power transistor of the second power amplifying part 356 performs complementary OFF-ON high-frequency switching in response to the fourth activation control signal Q2'. The power transistor of the first power amplifying part 353 performs ON-OFF high-frequency switching in response to the third activation control signal P3', and the power transistor of the second power amplifying part 357 performs complementary OFF-ON high-frequency switching in response to the fourth activation control signal Q3'. Accordingly, the three first power amplifying parts 351, 352, and 353 and the three second power amplifying parts 355, 356, and 357 of the power supplying part 20 perform high-frequency switching in response to the three-phase third activation control signals P1', P2', an P3' and the three-phase fourth activation control signals Q1', Q2', and Q3' The power amplifying part 20 supplies pulsive three-phase drive voltage signals V1, V2, and V3 to the three-phase windings 12, 13, and 14.

The other operation is similar to that in the above-mentioned Embodiment 5, and hence detailed description is omitted.

Various modifications are possible for the detailed configurations of the above-mentioned embodiments. For example, the winding of each phase can be composed of a plurality of partial windings which are interconnected in series or in parallel. The three-phase windings are not restricted to a star circuit, and can form a delta circuit. The phase number of the windings is not restricted to three, and a configuration using plural-phase windings is possible. Further, the number of magnetic poles of the field part of the rotor is not restricted to two, and can be an even number larger than two.

Each power transistor of the power supplying part can be composed of an NPN-type bipolar power transistors, a PNP-type bipolar power transistors, an N-channel MOS-type FET transistor, a P-channel MOS-type FET transistor, an IGBT transistor, or the like. The power transistors perform high-frequency switching operation, and the power loss and the heat generation in the power transistors are much reduced. This permits easy to integrate them into an IC. Further, various modifications are possible for the configuration of the power amplifying parts of the power supplying part and for the high-frequency switching operation of the power transistors. The FET power transistors can perform high-frequency switching operation between ON state (full or half ON state) and OFF state, and the drive current signals to the windings are altered smoothly with reduced power loss in the power transistors.

Further, various modifications are possible for the high-frequency switching operation of the power transistors of the power supplying part, and these are obviously included within the scope of the invention. For example, each of the first power transistors and the second power transistors can perform high-frequency switching operation alternatingly in each period. Further, a pair of the first power transistor and the second power transistor can perform high-frequency switching operation complementarily.

In case that the time interval T0 corresponds to one period of the position signal, the number of the states of the first state signal is not restricted to be six during one period of the position signal, and can be twelve, for example. Generally speaking, when the number of the states of the first state signal is an integer multiple of the phase number of the windings during one period of the position signal, an accurate first timing signal is obtained.

In case that the time interval T0 corresponds to a half period of the position signal, the number of the states of the first state signal is not restricted to be three during a half period of the position signal, and can be six, for example. Generally speaking, when the number of the states of the first state signal is an integer multiple of the phase number of the windings during a half period of the position signal, an accurate first timing signal is obtained.

An accurate estimation value of the rotational electrical angle is obtained from the first state signal and the second state signal which responds with the single position signal. Accordingly, the motor can accurately rotate over a wide range of the rotational speed from a low speed to a high speed by using the accurate estimation value of the rotational electrical angle. This is obviously included within the scope of the invention. In particular, the first state signal is obtained accurately even at a high rotational speed of the motor. This reduces the pulsation of the drive signal, and hence reduces the vibration and the acoustic noise at a high rotational speed.

The motor in accordance with the invention is suitable for disk drive apparatuses. However, the range of-its applications is wider than this and includes an application in office automation equipment, audio-visual equipment, and the like. Further, the motor can be used as a speed-controlled motor in general applications.

Further, various modifications are possible without departing from the spirit of the invention. These are obviously included within the scope of the invention.

I claim:

1. A disk drive apparatus comprising:
    head means for at least reproducing a signal from a disk or recording a signal on a disk;
    processing means for at least processing an output signal from said head means and outputting a reproduced signal, or processing a signal and outputting a recording signal into said head means;
    a rotor, having a field part which generates field fluxes, for driving said disk;
    Q-phase windings (Q is an integer of 3 or more);
    voltage supplying means, including two output terminals, for supplying a DC voltage;
    Q first power amplifying means, each of said Q first power amplifying means including a first power transistor for forming a current path between one output terminal side of said voltage supplying means and one of said Q-phase windings;
    Q second power amplifying means, each of said Q second power amplifying means including a second power transistor for forming a current path between the other output terminal side of said voltage supplying means and one of said Q-phase windings;
    position detecting means for producing a position signal which responds with a rotation of said rotor; and activation operation means for controlling active operation of said Q first power amplifying means and said Q second power amplifying means responding with said position signal of said position detecting means;

and that said activation operation means comprises:

time measuring means for measuring a time interval T0 which responds with an interval of said position signal;

signal producing means for producing at least an activation control signal which responds with an output signal of said time measuring means, thereby controlling an active operation of at least one power amplifying means among said Q first power amplifying means and said Q second power amplifying means responding with said at least an activation control signal;

and said signal producing means includes:

slope means for producing a slope signal whose cyclic interval responds with said time interval T0 of said time measuring means, said slope signal repeating a slope waveform substantially a plural times during one period of said position signal; and shaping means for producing said at least an activation control signal which varies substantially smoothly in at least one of rising and falling slopes responding with said slope signal.

2. The disk drive apparatus in accordance with claim 1, wherein said time measuring means measures said time interval T0 which is substantially equal to one period of said position signal, said slope means produces said slope signal which repeats substantially MQ (M is a positive integer) times during said time interval T0, and said signal producing means produces Q-phase activation control signals which respond with said slope signal.

3. The disk drive apparatus in accordance with claim 1, wherein said time measuring means measures said time interval T0 which is substantially equal to a half period of said position signal, said slope means produces said slope signal which repeats substantially NQ (N is a positive integer) times during said time interval T0, and said signal producing means produces Q-phase activation control signals which respond with said slope signal.

4. The disk drive apparatus in accordance with claim 1, wherein said signal producing means produces Q-phase first activation control signals which respond with said slope signal so as to control active operation of said Q first power amplifying means, each of said Q-phase first activation control signals varying substantially smoothly in at least one of rising and falling slopes responding with said slope signal.

5. The disk drive apparatus in accordance with claim 1, wherein said signal producing means produces Q-phase second activation control signals which respond with said slope signal so as to control active operation of said Q first power amplifying means, each of said Q-phase second activation control signals varying substantially smoothly in at least one of rising and falling slopes responding with said slope signal.

6. The disk drive apparatus in accordance with claim 1, further comprising commanding means for producing a command signal which responds with a rotational speed of said disk, said activation control means being adapted to change said at least an activation control signal responding with said command signal.

7. The disk drive apparatus in accordance with claim 1, further comprising commanding means for producing a command signal which responds with a rotational speed of said disk, and switching operation means for causing at least one power amplifying means among said Q first power amplifying means and said Q second power amplifying means to perform high-frequency switching responding with said command signal.

8. The disk drive apparatus in accordance with claim 7, wherein said switching operation means produces a switching pulse signal which responds with said command signal and causes one or two of said Q first power amplifying means to perform high-frequency switching simultaneously responding with said switching pulse signal.

9. The disk drive apparatus in accordance with claim 7, wherein said switching operation means comprises:

current detecting means for producing a current detection signal which responds with or corresponds to a composed current to said Q-phase windings from said voltage supplying means, and switching control means for causing said at least one power amplifying means to perform high-frequency switching responding with said current detection signal and said command signal.

10. The disk drive apparatus in accordance with claim 7, wherein said switching operation means controls the peak of the composed current to said Q-phase windings from said voltage supplying means responding with said command signal.

11. The disk drive apparatus in accordance with claim 1, wherein said position detecting means includes a position sensor which detects a field flux of said field part of said rotor so as to produce said position signal.

12. The disk drive apparatus in accordance with claim 1, wherein said activation operation means further includes:

first timing means for changing the state of a first state signal at an interval of a first adjust time T1 which responds with said time interval T0 and is less than T0/2; and second timing means for changing the state of a second state signal at an interval of a second adjust time T2 which responds with said time interval T0 and is less than T1/2; and said signal producing means produces said slope signal which responds with said second state signal, and produces said at least an activation control signal which responds with said first state signal and said slope signal.

13. The disk drive apparatus in accordance with claim 12, wherein said first timing means sets said first timing signal substantially to a first predetermined state responding with the measuring operation of said time measuring means.

14. The disk drive apparatus in accordance with claim 12, wherein said second timing means sets said second timing signal substantially to a second predetermined state responding with a changing operation of said first state signal.

15. A disk drive apparatus comprising:

head means for at least reproducing a signal from a disk or recording a signal on a disk;

processing means for at least processing an output signal from said head means and outputting a reproduced signal, or processing a signal and outputting a recording signal into said head means;

a rotor, having a field part which generates field fluxes, for driving said disk;

Q-phase windings (Q is an integer of 3 or more);

voltage supplying means, including two output terminals, for supplying a DC voltage;

Q first power amplifying means, each of said Q first power amplifying means including a first power transistor for forming a current path between one output terminal side of said voltage supplying means and one of said Q-phase windings;

Q second power amplifying means, each of said Q second power amplifying means including a second power transistor for forming a current path between the other output terminal side of said voltage supplying means and one of said Q-phase windings;

position detecting means for producing a position signal which responds with a rotation of said rotor; and activation operation means for controlling active operation of said Q first power amplifying means and said Q second power amplifying means responding with said position signal of said position detecting means;

and that said activation operation means comprises:

signal producing means for producing at least an activation control signal which responds with said position signal of said position detecting means, thereby controlling an active operation of at least one power amplifying means among said Q first power amplifying means and said Q second power amplifying means responding with said at least an activation control signal;

and said signal producing means includes:

slope means for producing a slope signal whose cyclic interval responds with the period of said position signal, said slope signal repeating a slope waveform at least two times during one period of said position signal; and shaping means for producing said at least an activation control signal which varies substantially smoothly in at least one of rising and falling slopes responding with said slope signal.

16. The disk drive apparatus in accordance with claim 15, wherein said slope means produces said slope signal which repeats substantially MQ times during the one period of said position signal (M is a positive integer).

17. The disk drive apparatus in accordance with claim 15, wherein said signal producing means produces Q-phase first activation control signals which respond with at least said slope signal so as to control active operation of said Q first power amplifying means, each of said Q-phase first activation control signals varying substantially smoothly in at least one of rising and falling slopes responding with said slope signal.

18. The disk drive apparatus in accordance with claim 15, wherein said activation operation means further includes:

time measuring means for measuring said time interval T0 of said position signal;

first timing means for changing the state of a first state signal at an interval of a first adjust time T1 which responds with said time interval T0 and is less than T0/2; and second timing means for changing the state of a second state signal at an interval of a second adjust time T2 which responds with said time interval T0 and is less than T1/2; and said signal producing means produces said slope signal which responds with said second state signal, and produces said at least an activation control signal which responds with said first state signal and said slope signal.

19. The disk drive apparatus in accordance with claim 15, further comprising commanding means for producing a command signal which responds with a rotational speed of said disk, and switching operation means for causing at least one power amplifying means among said Q first power amplifying means and said Q second power amplifying means to perform high-frequency switching responding with said command signal.

20. The disk drive apparatus in accordance with claim 19, wherein said switching operation means comprises:

current detecting means for producing a current detection signal which responds with or corresponds to a composed current to said Q-phase windings from said voltage supplying means, and switching control means for causing said at least one power amplifying means to perform high-frequency switching responding with said current detection signal and said command signal.

21. A motor comprising:

a rotor having a field part which generates field fluxes;

Q-phase windings (Q is an integer of 3 or more);

voltage supplying means, including two output terminals, for supplying a DC voltage;

Q first power amplifying means, each of said Q first power amplifying means including a first power transistor for forming a current path between one output terminal side of said voltage supplying means and one of said Q-phase windings;

Q second power amplifying means, each of said Q second power amplifying means including a second power transistor for forming a current path between the other output terminal side of said voltage supplying means and one of said Q-phase windings;

position detecting means for producing a position signal which responds with a rotation of said rotor; and activation operation means for controlling active operation of said Q first power amplifying means and said Q second power amplifying means responding with said position signal of said position detecting means;

and that said activation operation means comprises:

time measuring means for measuring a time interval T0 which responds with an interval of said position signal;

signal producing means for producing at least an activation control signal which responds with an output signal of said time measuring means, thereby controlling an active operation of at least one power amplifying means among said Q first power amplifying means and said Q second power amplifying means responding with said at least an activation control signal;
and said signal producing means includes:
slope means for producing a slope signal whose cyclic interval responds with said time interval T0 of said time measuring means, said slope signal repeating a slope waveform substantially a plural times during one period of said position signal; and
shaping means for producing said at least an activation control signal which varies substantially smoothly in at least one of rising and falling slopes responding with said slope signal.

22. The motor in accordance with claim 21, wherein
said time measuring means measures said time interval T0 which is substantially equal to one period of said position signal,
said slope means produces said slope signal which repeats substantially MQ (M is a positive integer) times during said time interval T0, and
said signal producing means produces Q-phase activation control signals which respond with said slope signal.

23. The motor in accordance with claim 21, wherein
said time measuring means measures said time interval T0 which is substantially equal to a half period of said position signal,
said slope means produces said slope signal which repeats substantially NQ (N is a positive integer) times during said time interval T0, and
said signal producing means produces Q-phase activation control signals which respond with said slope signal.

24. The motor in accordance with claim 21, wherein
said signal producing means produces Q-phase first activation control signals which respond with said slope signal so as to control active operation of said Q first power amplifying means, each of said Q-phase first activation control signals varying substantially smoothly in at least one of rising and falling slopes responding with said slope signal.

25. The motor in accordance with claim 21, wherein
said signal producing means produces Q-phase second activation control signals which respond with said slope signal so as to control active operation of said Q first power amplifying means, each of said Q-phase second activation control signals varying substantially smoothly in at least one of rising and falling slopes responding with said slope signal.

26. The motor in accordance with claim 21, further comprising
commanding means for producing a command signal which responds with a rotational speed of said disk,
said activation control means being adapted to change said at least an activation control signal responding with said command signal.

27. The motor in accordance with claim 21, further comprising
commanding means for producing a command signal which responds with a rotational speed of said rotor, and
switching operation means for causing at least one power amplifying means among said Q first power amplifying means and said Q second power amplifying means to perform high-frequency switching responding with said command signal.

28. The motor in accordance with claim 27, wherein
said switching operation means produces a switching pulse signal which responds with said command signal and causes one or two of said Q first power amplifying means to perform high-frequency switching simultaneously responding with said switching pulse signal.

29. The motor in accordance with claim 27, wherein
said switching operation means comprises:
current detecting means for producing a current detection signal which responds with or corresponds to a composed current to said Q-phase windings from said voltage supplying means, and
switching control means for causing said at least one power amplifying means to perform high-frequency switching responding with said current detection signal and said command signal.

30. The motor in accordance with claim 27, wherein
said switching operation means controls the peak of the composed current to said Q-phase windings from said voltage supplying means responding with said command signal.

31. The motor in accordance with claim 21, wherein
said position detecting means includes a position sensor which detects a field flux of said field part of said rotor so as to produce said position signal.

32. The motor in accordance with claim 21, wherein
said activation operation means further includes:
first timing means for changing the state of a first state signal at an interval of a first adjust time T1 which responds with said time interval T0 and is less than T0/2; and
second timing means for changing the state of a second state signal at an interval of a second adjust time T2 which responds with said time interval T0 and is less than T1/2; and
said signal producing means produces said slope signal which responds with said second state signal, and produces said at least an activation control signal which responds with said first state signal and said slope signal.

33. The motor in accordance with claim 32, wherein
said first timing means sets said first timing signal substantially to a first predetermined state responding with the measuring operation of said time measuring means.

34. The motor in accordance with claim 32, wherein
said second timing means sets said second timing signal substantially to a second predetermined state responding with a changing operation of said first state signal.

35. A motor comprising:
a rotor having a field part which generates field fluxes;
Q-phase windings (Q is an integer of 3 or more);
voltage supplying means, including two output terminals, for supplying a DC voltage;
Q first power amplifying means, each of said Q first power amplifying means including a first power transistor for forming a current path between one output terminal side of said voltage supplying means and one of said Q-phase windings;
Q second power amplifying means, each of said Q second power amplifying means including a second power transistor for forming a current path between the other output terminal side of said voltage supplying means and one of said Q-phase windings;

position detecting means for producing a position signal which responds with a rotation of said rotor; and activation operation means for controlling active operation of said Q first power amplifying means and said Q second power amplifying means responding with said position signal of said position detecting means;

and that said activation operation means comprises:

signal producing means for producing at least an activation control signal which responds with said position signal of said position detecting means, thereby controlling an active operation of at least one power amplifying means among said Q first power amplifying means and said Q second power amplifying means responding with said at least an activation control signal;

and said signal producing means includes:

slope means for producing a slope signal whose cyclic interval responds with the period of said position signal, said slope signal repeating a slope waveform at least two times during one period of said position signal; and shaping means for producing said at least an activation control signal which varies substantially smoothly in at least one of rising and falling slopes responding with said slope signal.

36. The motor in accordance with claim 35, wherein said slope means produces said slope signal which repeats substantially MQ times during the one period of said position signal (M is a positive integer).

37. The motor in accordance with claim 35, wherein said signal producing means produces Q-phase first activation control signals which respond with at least said slope signal so as to control active operation of said Q first power amplifying means, each of said Q-phase first activation control signals varying substantially smoothly in at least one of rising and falling slopes responding with said slope signal.

38. The motor in accordance with claim 35, wherein said activation operation means further includes:

time measuring means for measuring said time interval T0 of said position signal;

first timing means for changing the state of a first state signal at an interval of a first adjust time T1 which responds with said time interval T0 and is less than T0/2; and second timing means for changing the state of a second state signal at an interval of a second adjust time T2 which responds with said time interval T0 and is less than T1/2; and said signal producing means produces said slope signal which responds with said second state signal, and produces said at least an activation control signal which responds with said first state signal and said slope signal.

39. The motor in accordance with claim 35, further comprising commanding means for producing a command signal which responds with a rotational speed of said rotor, and switching operation means for causing at least one power amplifying means among said Q first power amplifying means and said Q second power amplifying means to perform high-frequency switching responding with said command signal.

40. The motor in accordance with claim 39, wherein said switching operation means comprises:

current detecting means for producing a current detection signal which responds with or corresponds to a composed current to said Q-phase windings from said voltage supplying means, and switching control means for causing said at least one responding with said current detection signal and said command signal.

* * * * *

UNITED STATES PATENT AND TRADEMARK OFFICE
CERTIFICATE OF CORRECTION

PATENT NO. : 6,759,821 B2
DATED : July 6, 2004
INVENTOR(S) : Makoto Gotou

It is certified that error appears in the above-identified patent and that said Letters Patent is hereby corrected as shown below:

Column 39,
Line 20, the phrase "substantially a" should be deleted.

Column 43,
Line 9, the phrase "substantially a" should be deleted.

Signed and Sealed this

Fifth Day of April, 2005

JON W. DUDAS
*Director of the United States Patent and Trademark Office*